United States Patent [19]
deSilva

[11] Patent Number: 5,857,064
[45] Date of Patent: Jan. 5, 1999

[54] SYSTEM FOR IMAGING COMPLEX GRAPHICAL IMAGES

[75] Inventor: Mahi deSilva, Cupertino, Calif.

[73] Assignee: Object Technology Licensing Corporation, Cupertino, Calif.

[21] Appl. No.: 946,127

[22] Filed: Oct. 7, 1997

Related U.S. Application Data

[63] Continuation of Ser. No. 415,979, Apr. 3, 1995.

[51] Int. Cl.$^6$ ........................................................ G06F 15/00
[52] U.S. Cl. .................................... 395/112; 345/522
[58] Field of Search .................................. 395/101, 104, 395/106, 109, 110, 111, 112, 113, 114, 115, 653; 364/130, 131, 148; 345/501, 502, 503, 506, 522, 523, 526; 382/276, 294, 299, 302, 303; 358/401, 448

[56] References Cited

U.S. PATENT DOCUMENTS

| | | | |
|---|---|---|---|
| 4,928,243 | 5/1990 | Hodges | 364/519 |
| 5,157,765 | 10/1992 | Birk et al. | 395/163 |
| 5,185,599 | 2/1993 | Doornink et al. | 345/200 |
| 5,261,029 | 11/1993 | Abi-Ezzi et al. | 345/123 |
| 5,333,246 | 7/1994 | Nagasaka | 395/133 |
| 5,502,804 | 3/1996 | Butterfield et al. | 395/147 |
| 5,524,186 | 6/1996 | Campbell | 395/115 |
| 5,566,278 | 10/1996 | Patel et al. | 395/114 |

OTHER PUBLICATIONS

Foley et al. "Computer Graphics Principles and Practice", 1990, Addison Wesley, US, p. 923 et al.

Apple Computer, Quickdraw GX Printing, 1994, Addison Wesley, US, pp. 1–3 et al.

Microsoft Corp. "Win32 Programmer's Reference", V.1, 1993, Microsoft Press, US, p. 786 et al.

*Primary Examiner*—Scott Rogers
*Assistant Examiner*—Gabriel I. Garcia
*Attorney, Agent, or Firm*—Kudirka & Jobse; James A. Ward

[57] ABSTRACT

An imaging system that provides a facility for converting highly functional complex graphical primitives that cannot be directly imaged by a less functional page description languages (PDL) such as PostScript or PCL into a plurality of less complex graphical primitives that can be directly imaged by a PDL. Some of these highly functional complex objects are three dimensional objects, high order curves, non regular areas, sampled three dimensional surfaces, off-centered pens, color blending and user programmable three dimensional shaders. These graphical objects are examined by a device handler, the characteristics of the object compared with the capabilities of the PDL of the device and if required the graphical object is transformed into a plurality of simpler objects that can be imaged by the PDL. Depending on the complexity of the graphical primitive, this transformation either creates a pixelmap of the image that is sent to the device at the device's resolution, or the transformation creates a plurality of graphic primitives supported by the device's PDL. Regardless, the desired complex image is printed, and the developer of an application program is able to utilize complex graphical primitives to develop an image that will be presented on a device irrespective of the limitations inherent in the device's actual PDL.

22 Claims, 21 Drawing Sheets

SYSTEM FOR IMAGING COMPLEX GRAPHICAL IMAGES

This is a continuation of application Ser. No. 08/415,979, filed Apr. 3, 1995.

COPYRIGHT NOTIFICATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

This invention generally relates to improvements in computer systems and, more particularly, to operating system software for displaying and printing documents.

BACKGROUND OF THE INVENTION

One of the most important aspects of a modem computer system is the ability to generate an image of textual or graphical information. This information can be manipulated by the computer, visually displayed and stored. This display is generally performed by a display monitor and by a "hard" printed copy. To create the hard copy of this information, a computer system generally includes a printing device which is electrically connected to the computer system and controlled by it in order to generate a permanent image on a selected medium. Examples of raster oriented printing devices in common use are dot matrix, ink jet and LASER printers that fix permanent images on paper under control of the computer. Although paper is the most common medium, other media are often used, such as photographic film and overhead transparencies.

FIG. 3a indicates the correspondence between a computer memory raster 3a01 contains an image 3a02 which can be displayed on a raster monitor 3a06 or a raster printer 3a08. The memory raster 3a01 is sent to the printer 3a08 as indicated by arrow 3a09. The printer 3a08 transfers the raster image 3a02 to a resulting image 3a04 on paper 3a03. Similarly, the memory raster 3a01 is sent to a monitor 3a06 as indicated by arrow 3a10. The display 3a06 transfers the raster image 3a02 to a resulting image 3a07 on the display 3a06. Images 3a07 and 3a04 are dependent on the resolution of each device. The same image 3a02 if sent to devices of differing resolution will be produced at different sizes.

In order to print a document that is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include the insertion of control commands into the printable information in order to control the printing device. These added commands may, for example, include such commands as carriage returns, line feeds, form feeds, spaces and font information, all of which format the printable information. The reformatting may also include a conversion step in which the information is converted into the form used by the printing device. For example, if the printer uses the PostScript page description language, this reformatting would include the creation of a PostScript program to generate the printed page. Similarly, if the printer uses the PCL page description language.

The pagination and reformatting necessary to convert the printable information into a form which can be printed on a given printing device is generally performed by software programs running within the computer system. Software programs operating on a computing system generally can be categorized into two broad classes: operating systems which are usually specific to a type of computer system and consist of a collection of utility programs that enable the computer system to perform basic operations, such as storing and retrieving information on a peripheral disk memory, displaying information on an associated video display, performing rudimentary file operations including the creation, naming and renaming of files and, in some cases, performing diagnostic operations in order to discover or recover from malfunctions.

By itself, the operating system generally provides only very basic functions and must be accompanied by an "application" program. The application program interacts with the operating system to provide much higher level functionality and a direct interface with the user. During the interaction between the application program and the operating system, the application program typically makes use of operating system functions by sending a series of task commands to the operating system which then performs the requested tasks. For example, the application program may request that the operating system store particular information on the computer disk memory or display information on the video display.

FIG. 1 is a schematic illustration of a typical computer system utilizing both an application program and an operating system. The computer system is schematically represented by box 100, the application program is represented by box 102 and the operating system by box 106. The interaction between the application program 102 and the operating system 106 is illustrated schematically by arrow 104. This dual program system is used on many types of computers systems ranging from mainframes to personal computers.

The method for handling printing, however, varies from computer to computer, and, in this regard, FIG. 1 represents a prior art personal computer system. In order to provide printing functions, the application program 102 interacts (as shown schematically by arrow 108) with printer driver software 110. Printer driver software 110 is generally associated with an application program and reformats and converts the printable information as necessary. Since each printer has its own particular format and control command set, which must be embedded in the text properly to control the printer, the printer driver software 110 must be specifically designed to operate with one printer or one type of printer. Application support for differing types of printers generally requires support for a specialized printer driver for each type of printer supported. Often a multitude of printer drivers were provided with the application to support a wide range of printing devices.

The printer driver software 110 produces a reformatted information stream containing the embedded commands as shown schematically as arrow 114. The converted information stream is, in turn, applied to a printer port 112 which contains circuitry that converts the incoming information stream into electrical signals. The signals are, in turn, communicated to the printer 118 via some data pathway 116 such as a dedicated cable or a network. Printer 118 usually contains an "imaging engine" which is a hardware device or a ROM-programmed computer which takes the incoming information stream and converts it into the electrical signals necessary to drive the actual printing elements. The result is a "hard copy" output on the selected medium.

While the configuration shown in FIG. 1 generally works in a satisfactory manner, it has several drawbacks. Since the printer driver software 110 is specific to each type of printer, a separate driver had to be provided for each printer type with which the application program is to operate. In the personal computer market, there are a large number of different printer types that are compatible with each type of computer and, therefore, as the number of printer types proliferated, so did the number of printer drivers which were required for each application program so that the program was compatible with most available printers. Therefore, application program developers had to provide, test, and support larger and larger numbers of printer drivers with each application program, resulting in wasted time and effort and wasted disk space to hold the drivers, only one or two of which were of interest to any particular user. Unfortunately, if a user purchased an application program and it did not include a printer driver which could control the printer which the user owned, unpredictable operation occurred, resulting in program returns and user dissatisfaction.

In addition, it was also necessary for each application program to provide high level printing functions such as pagination and page composition (including addition of margins, footnotes, figure numbers, etc.) if such functions were desired. Consequently, each application program developer had to spend time developing programs to implement common printing functions which programs were specific to each application program, thereby resulting in duplicated effort and wasted time.

In order to overcome the aforementioned difficulties, the prior art arrangement was modified as shown in FIG. 2. In this new arrangement, computer system 200 is still controlled by application program 202 which cooperates, as shown schematically by arrow 204, with operating system 206. However, in the system shown in FIG. 2 operating system 206 includes printer drivers 214. A separate printer driver must still be provided for each different type of printer, but the printer drivers are sold with, and part of, the operating system. Consequently, it is not necessary for each application program to have its own set of printer drivers. An application program, such as application program 202, communicates with the printer driver 214 by means of a standardized interface 210. Two common interfaces are called "grafports" or "device contexts". Illustratively, application program 202 provides information (schematically shown by arrow 208) in a standardized form to the grafport 210. The grafport 210, in turn, forwards information, as shown by arrow 212, to printer driver 214 which reformats and converts the information as previously described into the format required by the printer. The output of printer driver 214 is provided (illustratively shown as arrow 216) to printer port 218 where it is converted to electrical signals that are transmitted, via a data pathway 220, to the printer 222.

The configuration shown in FIG. 2 has the advantage that the application program developer need not worry about the specific computer and printer combination on which the program will ultimately run in order to provide printing capabilities to the application program. However, it still suffers from the drawback that, if desired, high level printing capabilities such as pagination and page composition must still be designed into each application program, thereby duplicating program code and wasting programming resources.

These problems were addressed by providing an object-oriented printing interface that communicated with the remainder of the operating system through a standard interface such as a grafport and printer drivers provided for each printer type within the operating system. So that an application not only need not worry about the particular printer/computer combination with which it is to operate, but also need not have a built in document formatting capability. This printing interface included objects that provided queries for device identification, optimized imaging, and printer status. Other objects were also provided for data transfer to bracket connections prior to sending and receiving information. Still other objects were provided for canceling a print job, pausing a job, and clearing out a job. Finally, an object was also provided for supporting multiple streams of communication to an imaging task.

FIG. 4 shows a schematic overview of another prior art computer system utilizing an object-oriented printing interface. The computer system is shown generally as a box 400, and an application program 402 and an operating system 406 are provided to control and coordinate the operations of the computer. Application program 402 communicates with operating system 406 as indicated by arrow 404. However, in accordance with an embodiment of the invention, rather than communicating directly with a standard interface, such as grafport 410, application program 402 can now communicate with operating system 406 at a higher level when it wishes to print information. This latter interaction is accomplished by providing an object-oriented printing interface shown schematically as box 424. Printing interface 424 responds to a series of simple commands generated by application program 402 in order to perform various formatting and pagination functions. The formatted, printable information is then transmitted to a grafport 410 as indicated schematically by arrow 426. It is possible for application program 402 to communicate directly with grafport 410 as in the prior art arrangement shown in FIG. 2, however, it is not expected that this will be the normal mode of operation.

In any case, the information flows through grafport 410, and as indicated by arrow 412, is provided to a printer handler 414. Printer handler 414 is similar to printer drivers previously described. However, it is "intelligent" and offers some additional capabilities. Essentially, printer handler 414 processes the incoming data stream indicated by arrow 412 and adds the necessary printer commands to control the associated printer schematically illustrated as printer 422. The reformatted printer data stream is provided, as indicated by arrow 416, to a printer port 418 which converts the data into electrical signals that are sent over data pathway 420 to printer 422.

Although a significant improvement over the previously described art shown in FIG. 2, this approach still suffers from the drawback that once the Printing interface 424 provided support for highly functional graphic command objects—objects that could not be simply represented within the printer's PDL—the print driver would either simply not perform the command, or fall back to printing a low resolution pixelmap representative of the image associated with the object. This problem is demonstrated with graphic primitives such as high order curves, sampled 3D surfaces, non-centered pens, color masks and color blending transfer modes, and user programmable 3D shaders. These graphic commands are not supported in either PCL version 5 or PostScript.

SUMMARY OF THE INVENTION

The foregoing problems are overcome and the foregoing object is achieved in an illustrative embodiment of the invention in which an object-oriented printing interface includes a method for transforming graphical objects that are too complex to be directly translated into the printing device's command primitives. The graphical objects are first sent to the printing device where the translatable objects are translated into the device's command primitives. Then the graphical objects are examined to select the objects that require special handling. These objects are examined and based upon the complexity of the object and the capabilities of the printing device, the object is either decomposed into a plurality of imageable objects and printed; or a pixel map of the object is generated, adjusted for intersections with other objects and printed.

brief DESCRIPTION OF THE DRAWINGS

The above and further advantages of the invention may be better understood by referring to the following description in conjunction with the accompanying drawings, in which.

DETAILED DESCRIPTION OF THE ILLUSTRATIVE EMBODIMENTS

Figure 1:
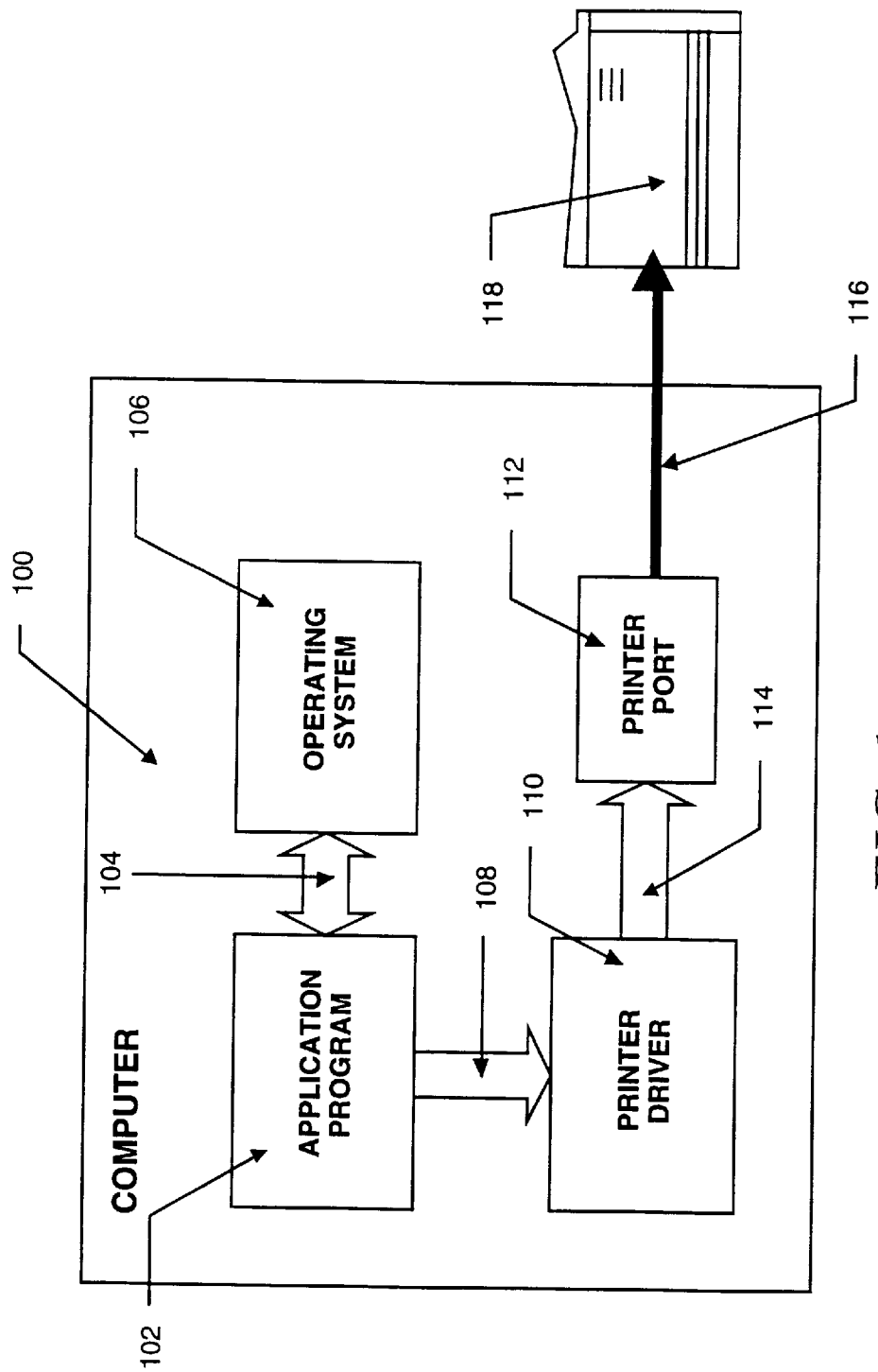
FIG. 1 is a schematic block diagram of a prior art computer system showing the relationship of the application program to the operating system and the printer driver in the prior art.
Figure 2:
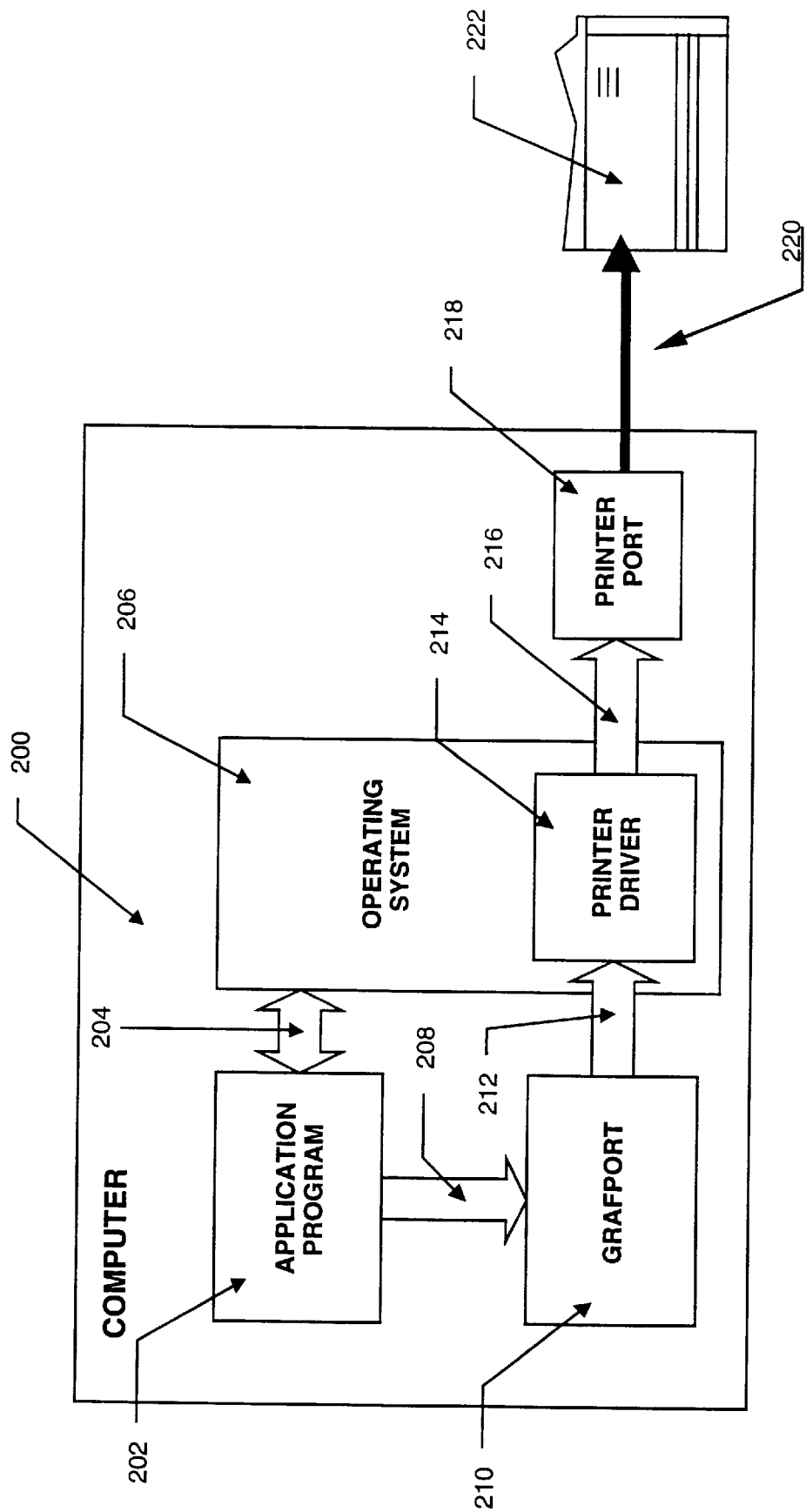
FIG. 2 is a schematic block diagram of a modification of the prior art system shown in FIG. 1 to allow the application program to interface to a standard printing interface in the prior art.
Figure 3:
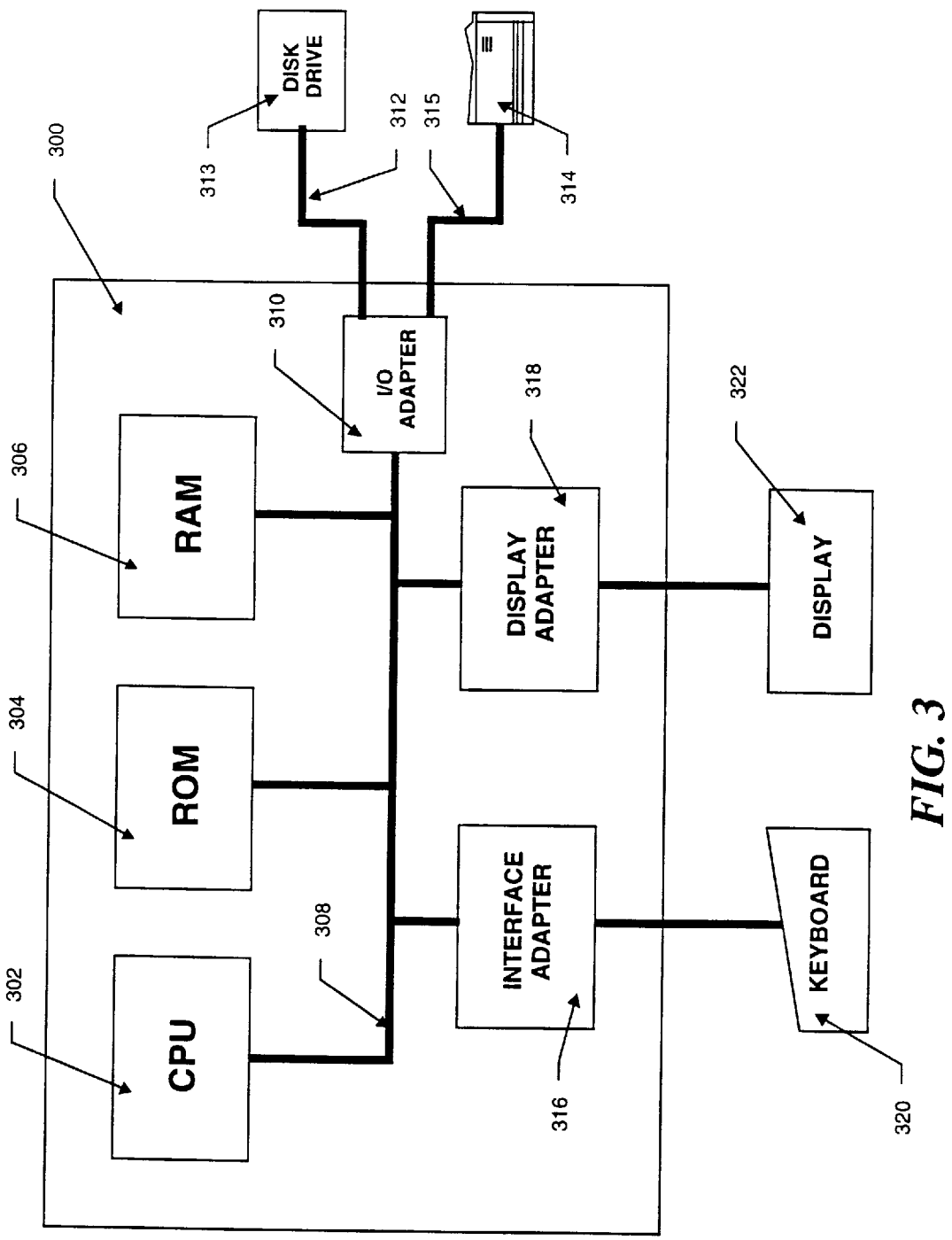
FIG. 3 is a block schematic diagram of a computer system, for example, a personal computer system on which the inventive object-oriented printing interface operates in accordance with a preferred embodiment.
Figure 3A:
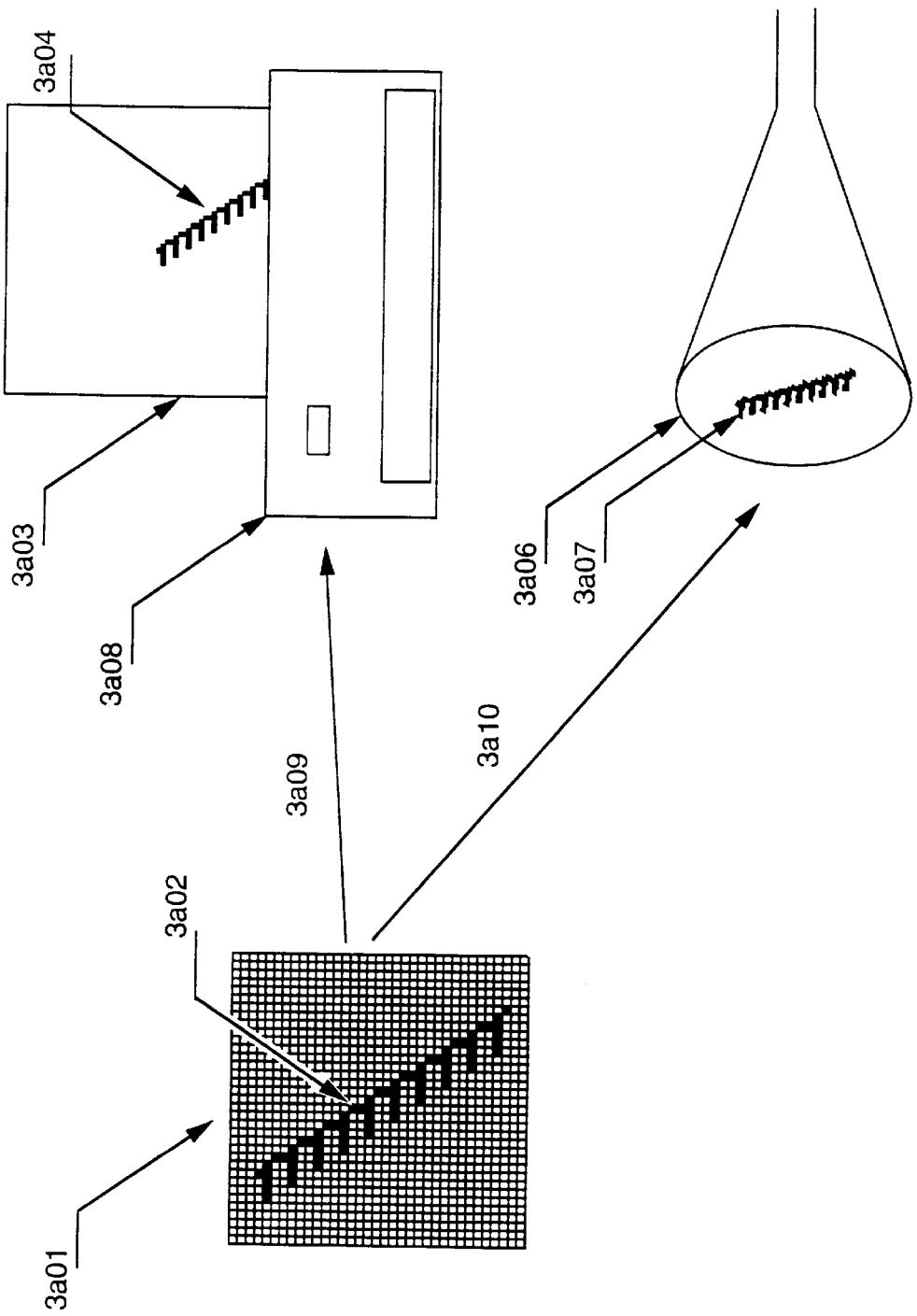
FIG. 3a is a schematic diagram of the correspondence of pixels in memory with the resulting output from a pixel oriented imaging device.

The invention is preferably practiced in the context of an operating system resident on a personal computer such as the IBM PS/2, or Apple, Macintosh, computer. A representative hardware environment is depicted in FIG. 3, which illustrates a typical hardware configuration of a computer 300 in accordance with the subject invention. The computer 300 is controlled by a central processing unit 302, which may be a conventional microprocessor; a number of other units, all interconnected via a system bus 308, are provided to accomplish specific tasks. Although a particular computer may only have some of the units illustrated in FIG. 3 or may have additional components not shown, most computers will include at least the units shown.

Specifically, computer 300 shown in FIG. 3 includes a random access memory (RAM) 306 for temporary storage of information, a read only memory (ROM) 304 for permanent storage of the computer's configuration and basic operating commands and an input/output (I/O) adapter 310 for connecting peripheral devices such as a disk unit 313 and printer 314 to the bus 308, via cables 315 and 312, respectively. The function provided by cables 315 and 312 may be implemented via a network connection. A user interface adapter 316 is also provided for connecting input devices, such as a keyboard 320, and other known interface devices including mice, speakers and microphones to the bus 308. Visual output is provided by a display adapter 318 which connects the bus 308 to a display device 322 such as a video monitor. The workstation has resident thereon and is controlled and coordinated by operating system software such as the Apple System/7, operating system.

In a preferred embodiment, the invention is implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements and routines, or functions, which manipulate the data elements. The data and related functions are treated by the software as an entity and can be created, used and deleted as if they were a single item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

As will be recognized by those skilled in the art, the instant invention can be implemented in a procedural programming environment as well as an object-oriented one.

Objects are defined by creating "classes" which are not objects themselves, but which act as templates that instruct the compiler how to construct the actual object. A class may, for example, specify the number and type of data variables and the steps involved in the functions which manipulate the data. An object is actually created in the program by means of a special function called a constructor which uses the corresponding class definition and additional information, such as arguments provided during object creation, to construct the object. Likewise objects are destroyed by a special function called a destructor. Objects may be used by using their data and invoking their functions.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, during compilation, the C++ compiler will determine which of the three functions is actually being used by examining the variable types. The compiler will then substitute the proper function code. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Although object-oriented programming offers significant improvements over other programming concepts, program development still requires significant outlays of time and effort, especially if no pre-existing software programs are available for modification. Consequently, a prior art approach has been to provide a program developer with a set of pre-defined, interconnected classes which create a set of objects and additional miscellaneous routines that are all directed to performing commonly-encountered tasks in a particular environment. Such pre-defined classes and libraries are typically called "application frameworks" and essentially provide a pre-fabricated structure for a working application.

For example, an application framework for a user interface might provide a set of pre-defined graphic interface objects which create windows, scroll bars, menus, etc. and provide the support and "default" behavior for these graphic interface objects. Since application frameworks are based on object-oriented techniques, the pre-defined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of the original program. In addition, developers are not blindly working through layers of code because the framework provides architectural guidance and modeling and, at the same time, frees the developers to supply specific actions unique to the problem domain.

There are many kinds of application frameworks available, depending on the level of the system involved and the kind of problem to be solved. The types of frameworks range from high-level application frameworks that assist in developing a user interface, to lower-level frameworks that provide basic system software services such as communications, printing, file systems support, graphics, etc. Commercial examples of application frameworks include MacApp (Apple), Bedrock (Symantec), OWL (Borland), NeXT Step App Kit (NeXT), and Smalltalk-80 MVC (ParcPlace).

While the application framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, application frameworks generally consist of one or more object "layers" on top of a monolithic operating system and even with the flexibility of the object layer, it is still often necessary to directly interact with the underlying operating system by means of awkward procedural calls.

In the same way that an application framework provides the developer with prefab functionality for an application program, a system framework, such as that included in a preferred embodiment, can provide a prefab functionality for system level services which developers can modify or override to create customized solutions, thereby avoiding the awkward procedural calls necessary with the prior art application frameworks programs. For example, consider a printing framework which could provide the foundation for automated pagination, pre-print processing and page composition of printable information generated by an application program. An application software developer who needed these capabilities would ordinarily have to write specific routines to provide them. To do this with a framework, the developer only needs to supply the characteristics and behavior of the finished output, while the framework provides the actual routines which perform the tasks.

A preferred embodiment takes the concept of frameworks and applies it throughout the entire system, including the application and the operating system. For the commercial or corporate developer, systems integrator, or OEM, this means all of the advantages that have been illustrated for a framework such as MacApp can be leveraged not only at the application level for such things as text and user interfaces, but also at the system level, for services such as printing, graphics, multi-media, file systems, I/O, testing, etc.

Figure 4:
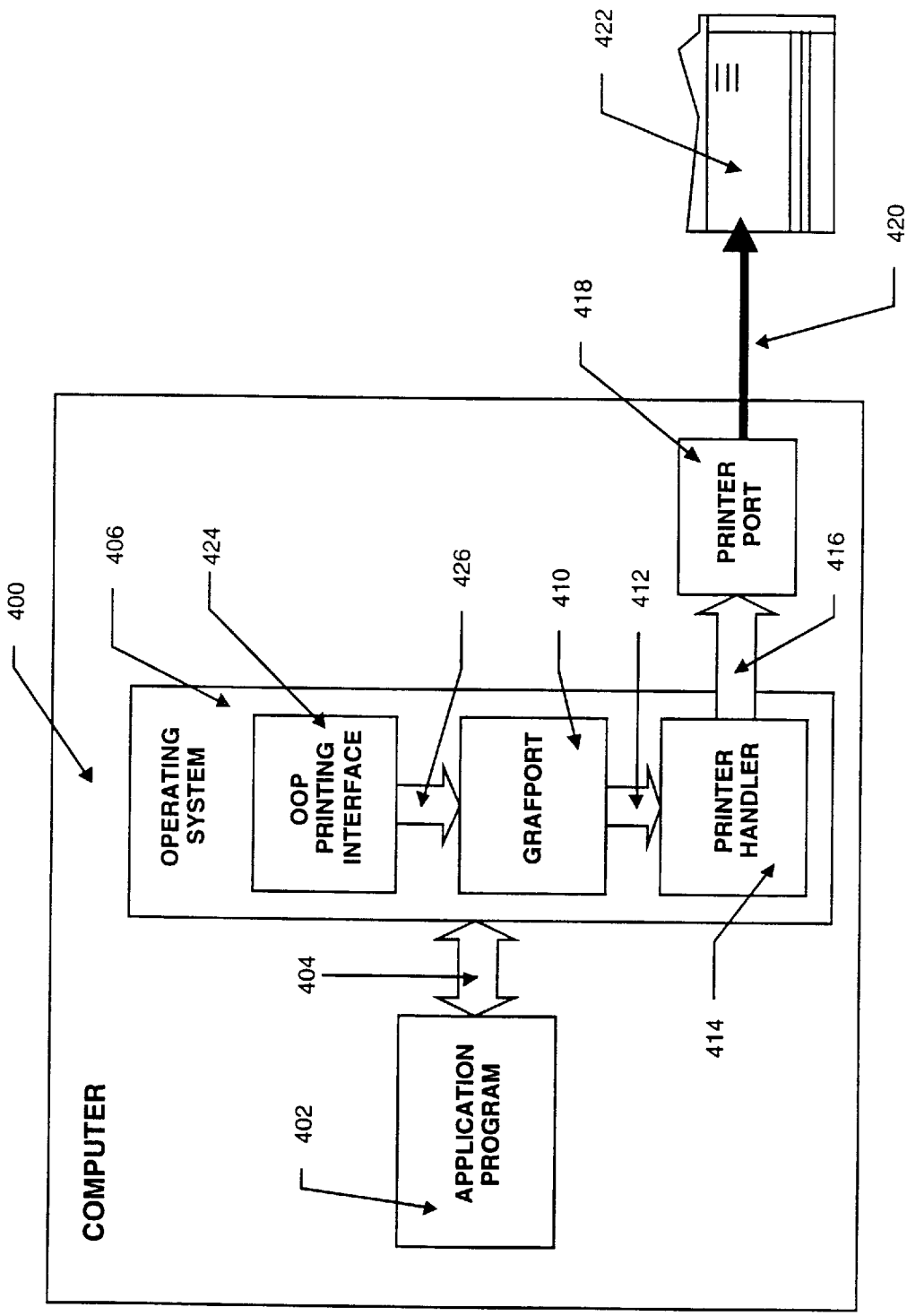
FIG. 4 is a schematic block diagram of a modification of the prior art system shown in FIG. 2 in which the operating system includes an object-oriented printing interface in accordance with a preferred embodiment.

FIG. 4 shows a schematic overview of a computer system utilizing the object-oriented printing interface that uses the present invention. The computer system is shown generally as box 400, and an application program 402 and an operating system 406 are provided to control and coordinate the operations of the computer. Application program 402 communicates with operating system 406 as indicated by arrow 404. However, in accordance with an embodiment of the invention, rather than communicating directly with a standard interface, such as grafport 410, application program 402 can now communicate with operating system 406 at a higher level when it wishes to print information. This latter interaction is accomplished by providing an object-oriented printing interface shown schematically as box 424. Thus, the application program 402 sends graphic objects to the object-oriented printing interface 424. These graphic objects include those that define both textual and graphical images. Printing interface 424 responds to these objects in order to perform various formatting and pagination functions. The formatted information is then transmitted to a grafport 410 as indicated schematically by arrow 426.

In any case, the information flows through grafport 410, and as indicated by arrow 412, is provided to a printer handler 414. Printer handler 414 is similar to printer drivers previously described. However, it is "intelligent" and offers some additional capabilities which will be described herein. Essentially, printer handler 414 processes the incoming data stream of graphic objects indicated by arrow 412 and adds the necessary printer commands to control the associated printer schematically illustrated as printer 422. The resulting printer data stream is provided, as indicated by arrow 416, to a printer port 418 which converts the data into electrical signals that are sent over data pathway 420 to printer 422 which processes the data and generates an image responsive to the data on the print medium.

Figure 5:
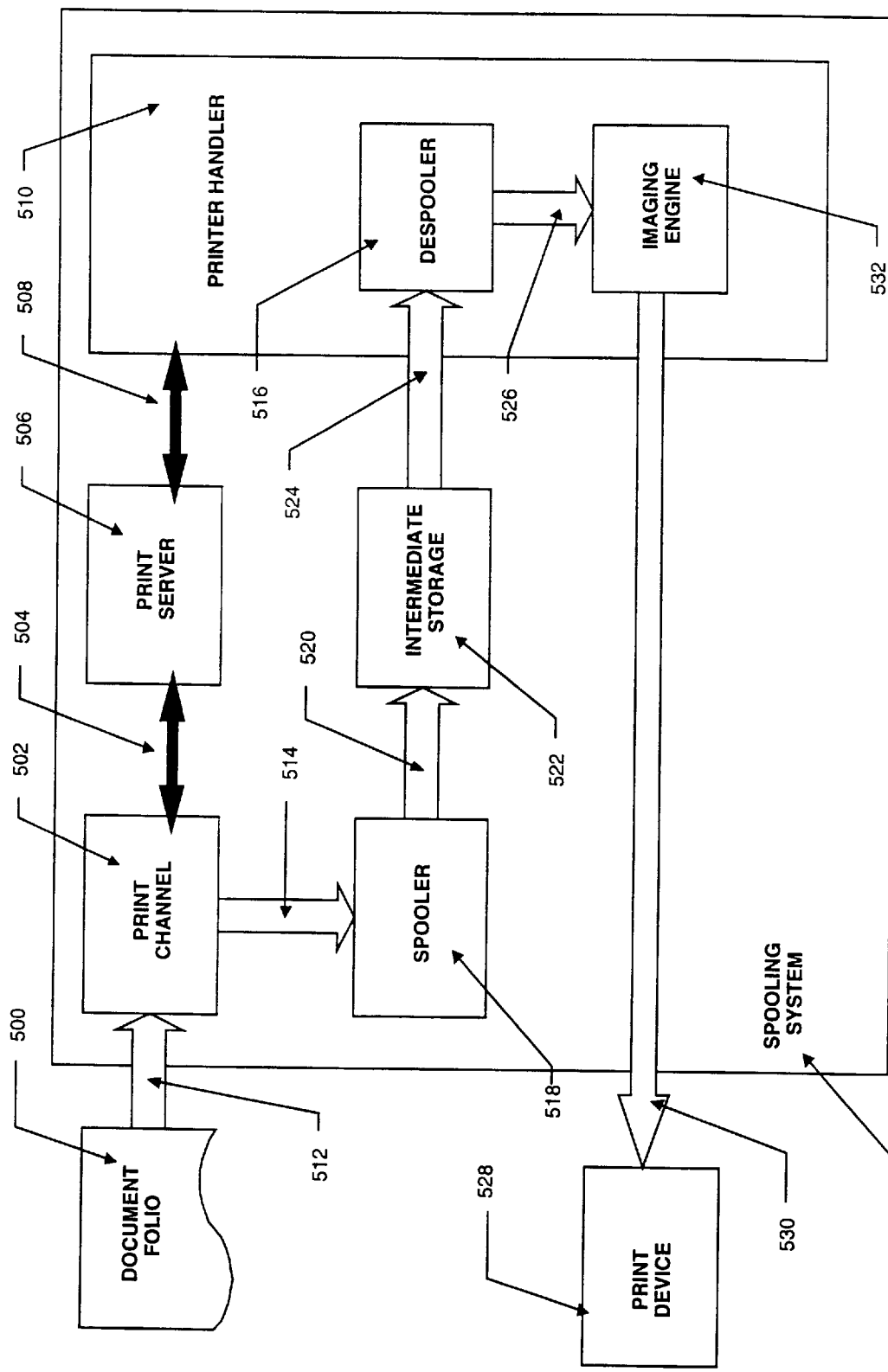
FIG. 5 is a block schematic diagram of the information paths and hardware by which printable information is channeled through intermediate storage to a print device in accordance with a preferred embodiment.

The actual mechanism by which a document generated by the printing interface 424 is transmitted to printer 422 is shown in more detail in FIG. 5. In particular, printing interface 424 generates an entity called a document folio shown schematically as document folio 500 in FIG. 5. The document folio consists of graphics objects that include objects that define textual images, objects that define graphical images or a combination of the two, all formatted and arranged in a manner specified by the application program. The document folio information is provided, as indicated by arrow 512, to the spooling system 501 by presentment to the print channel 502. Print channel 502 is an object which is created to transport the information to an appropriate printer. Print channel uses a print job description and a printer identification provided by the application program to transmit the printable information to the appropriate printer.

More specifically, after the print channel 502 receives a printing job, it transmits the printable information to a spooler program 518 as indicated by arrow 514. Spooler 518 receives the incoming information stream and stores it, in incoming order, in an intermediate storage location 522 as indicated by arrow 520. Print channel 502 then sends a notification to a print server program 506 via a link 504, which notification informs print server program 506 that a new print job exists. The print server program 506 is a standard program which monitors all print jobs that have been created and also checks the available printers to determine their status.

Once a print job has been completely spooled or stored in intermediate storage 522, the print server 506 notifies a printer handler 510 by means of a link 508. The printer handler 510 is a type of printer driver which controls and drives a specific printer; its purpose is to convert textual and graphical objects into printer readable form for any particular printer type—to create a printer data stream, indicated schematically by arrow 530. Typically, a printer handler can only process one print job and any other jobs that are created and directed towards the associated printer are queued for later processing. The printer handler contains a de-spooler program (indicated as box 516) which retrieves the spooled data from intermediate storage 522 (as indicated by arrow 524) and provides the information, as indicated by arrow 526, to an imaging engine schematically illustrated as box 532. The imaging engine 532 converts the incoming data stream into the command signals which are necessary to drive the printing elements to produce the final printed document. The string of commands make up the printer data stream 530. The printer data stream 530 is provided to the actual print device indicated by box 528 for printing.

These command signals are printer dependent. Many different printers support one or more common page description languages (PDLs) such as PostScript or PCL. The printer command primitives provided by the PDL must include a primitive that provides the printer with the ability to receive a pixelmap to be printed. Example PostScript PDL commands that would provide this facility are the "image" and "imagemask" commands.

Figure 8:
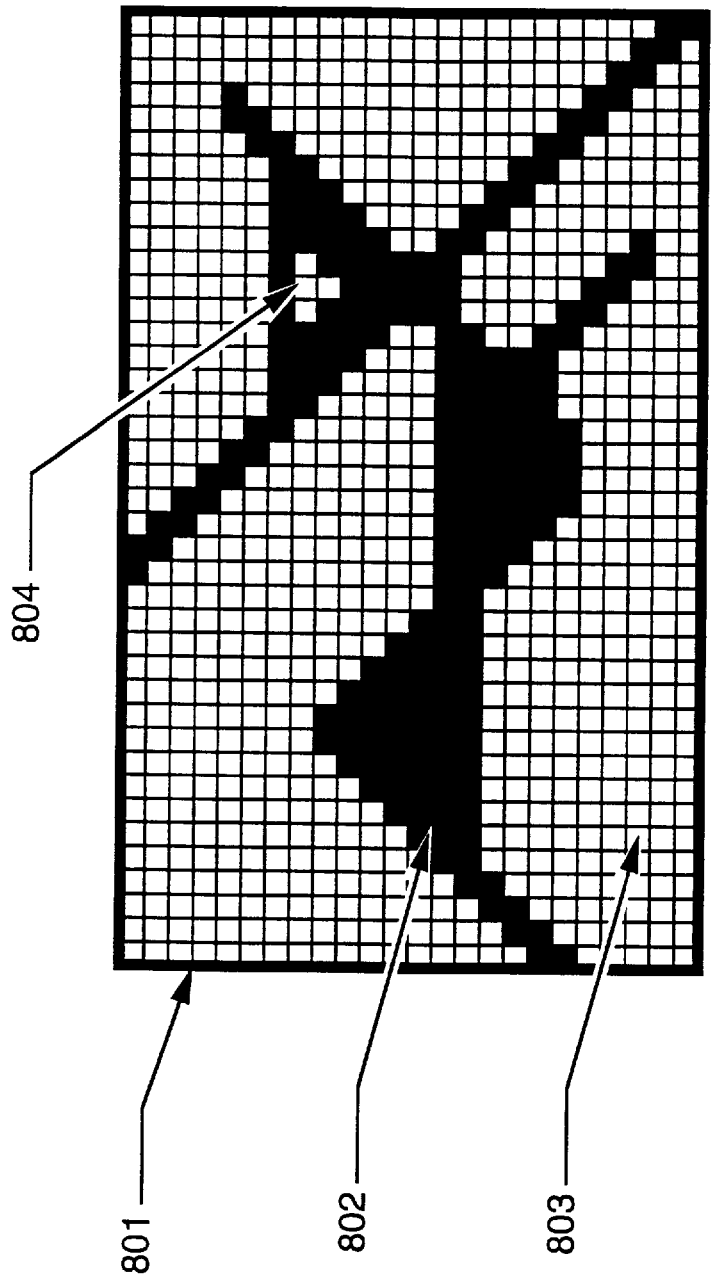
FIG. 8 demonstrates how an image is rendered in a pixel map form in accordance with a preferred embodiment.

A pixelmap is a rectangular array of pixels as shown in FIG. 8 by the box 801 surrounding the pixelated image 802. Each pixel, one of which is indicated by 803, potentially has a characteristic such as color or intensity but which may be as simple as a binary value. For this example, the group of three pixels at 804 are intended to be transparent.

Some graphical objects may have the characteristic that they cannot be directly imaged by the PDL supported by the print device 528. The instant invention is a means to detect these objects—non-imageable objects—and to transform them into a group of imageable objects so that the desired image corresponding to the object is printed. This is the subject matter of the instant invention and is further described below.

Once a print job is completely printed, the printer handler 510 checks its queue for another print job and, if a job is present, begins processing it. Alternatively, if there are no new print jobs to process, the printer handler becomes inactive. After a particular print job is completed, the information stored in intermediate storage in 522 is deleted and the storage is reclaimed. As an option, the storage can be retained until a user explicitly deletes the storage.

The printer handler framework facilitates creation of frameworks for different types of printers like PostScript printers, raster, vector, and PCL printers. A preferred embodiment provides a framework that is extensible so that new printers can be added to the system very easily. This includes printers with new imaging models, communication protocols, etc. The preferred embodiment also provides a framework that does most of the work to support a printer and at the same time provides enough flexibility for developer customization. The preferred embodiment also allows developer customization at various times during the printing process. Customization occurs at the desktop printer level for presenting device specific user interface, at print time for setting print time features (like duplex printing, multi-bin paper feeding, etc.), at imaging time, by providing a way to access the device at the beginning/end of document and page, and by providing a way to customize rendering of graphics model primitives. Finally, at the device level to support different communication protocol(s).

Clients

All printer manufacturers are clients of the printer handler framework. A client uses a framework to design PostScript, raster, vector, and PCL printer handler frameworks. Developers start from one of these special types of frameworks and customize it for their printers. For example, a PostScript printer developer (like QMS or Linotype) would use the PostScript printer framework, a plotter developer (like CalComp) would customize the vector printer handler framework.

Architecture

The desktop printer is the only user visible part of the printer. All user actions (commands) related to the printer are handled by this object. When a document is to be printed, it is dragged to the printer icon (or the Print item is selected from the system wide menu). This starts the printing process by first spooling the document by packaging it as a print job. Spooling is a process of streaming the graphic description of a document to the disk so it can be imaged later (possibly in a different task) to the actual printing device represented by the desktop printer. The spooled print job is stored in the printer's persistent data which consists mainly of the print job queue and the printer's dynamic configuration. After the print job is spooled, the printer handler is sent a message that there is a print job for it to process. The printer handler picks up the print job, despools it, converts it to the printer's native imaging model and sends it to the printer.

User's Model of Printing

A reference to a printer in a preferred embodiment really mean a printer model and its associated files, which includes the printer handler. A model is a class that is subclassed from an existing class. Since all user visible entities on a system are models, or the interface presented by them, it makes sense to talk about a printer this way. Each printer model keeps its persistent data (job queue, configuration, etc.) in its model store. The model store provides a way for a model to create separate files that it alone manages. It has protocol for interfacing to a file system. The printer "component" has certain dependencies that must be satisfied when it is moved between machines or enclosed in a business card. A printer is typically dependent on its personality document, the shared library and archive for the system classes that implement the printer, and the shared library and archive for the developer supplied customizations.

When a user "installs" a printer handler in the system, it is immediately available for direct connect devices or in the network browser for network devices. This processing is facilitated by creating a physical model for a direct connect device and a service adapter is "registered" for a network device. A physical device object represents a real device that can be connected directly to the computer (as opposed to available on the network). It is capable of creating a subclass that represents the device. A service adapter indicates the directory protocols (AppleTalk Name Binding Protocol (NBP), Domain Naming System (DNS) etc.) and service identifiers (LaserWriter) it can handle and is called on by a directory service to create a model for a service available on a physical directory. To print to a direct connect device, a user connects the printer to the computer (for serial devices) and then drags a document to it. To print to a network device, either the document is dragged to the printer in the network browser or the printer is dragged to the desktop and then the document is dragged to it.

Printer Personality Document

Figure 6:
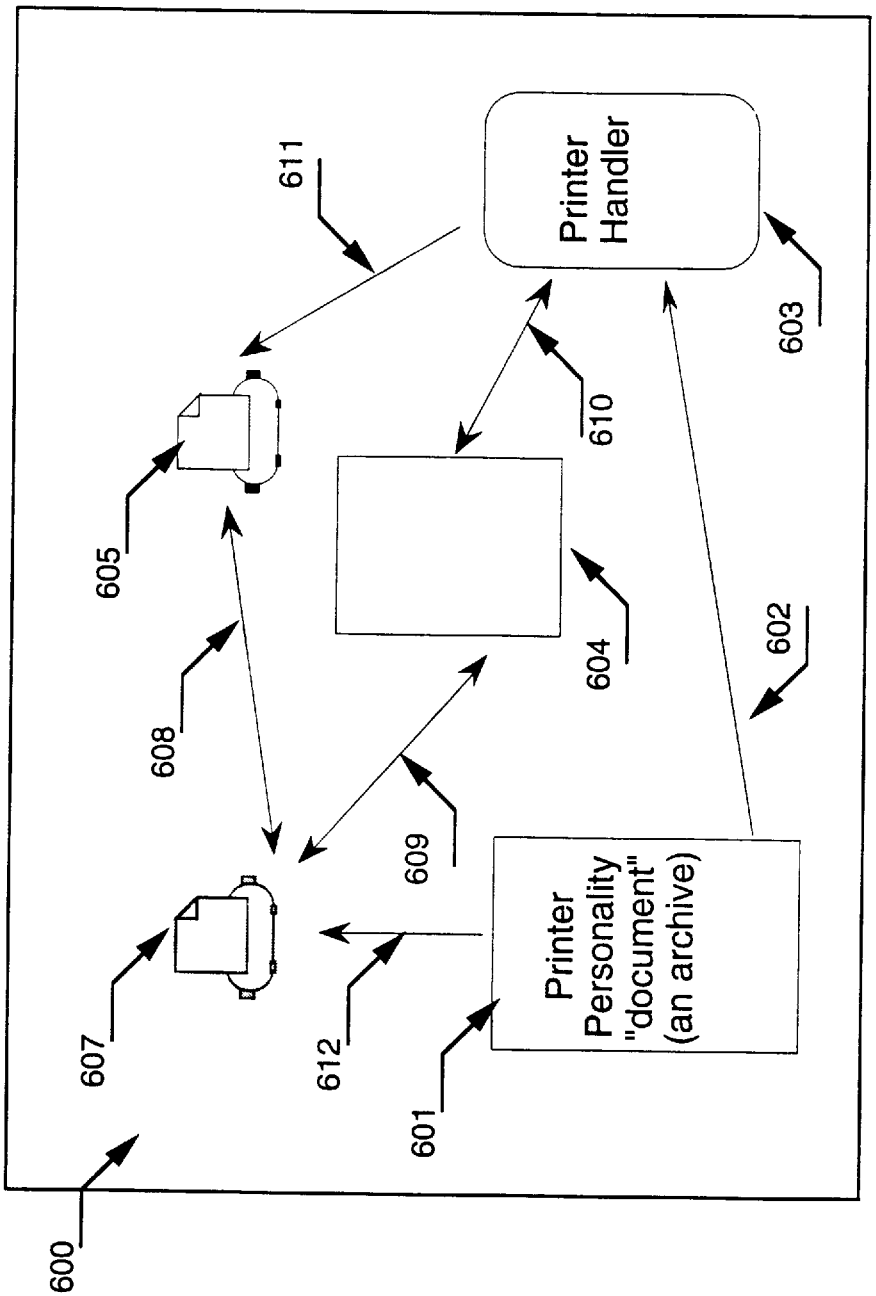
FIG. 6 shows how the personality document is used by different parts of the printing system in accordance with a preferred embodiment.

A personality document is supplied by the device manufacturer. The printer personality "document" contains instances of objects, just the data, that implement a particular printer. In other words, it is a shared library without code—just the archive. Examples of objects in the personality document are the printer configuration, printer resolution, print job description which specifies the print time options available on the printer, and the print device object that converts the graphic data into the printer's imaging model. FIG. 6 shows how the personality document is used by different parts of the printing system 600. The personality document 601 supplied by the developer is used in read-only mode by the printing system 600. The desktop printer 605 and the printer handler 603 "read" this document to access its personality objects polymorphically. The desktop printer 607 accesses the printer personality document 601 as shown by arrow 612 to obtain printer dialogs. The desktop printer 607 communicates with the physical printer 605 indicted by arrow 608 to obtain the physical printer's configuration, setup, and other similar printer information. The desktop printer 605 maintains the dynamic state of the printer, the print job queues, status, and other relevant information in the printer's persistent state 604 as indicated by arrow 609. This information in turn is accessed by the printer handler 603 as shown by arrow 610. Printer handler 603 converts the queued data into a form suitable for the physical printer 605 and sends the converted data to the physical printer 605 as schematically indicated by arrow 611.

A printer personality document provides the printer's attributes. One of these attributes is a complexity threshold.

This threshold may be determined from other attributes of the printer such as the printer model, memory capability and page description language (PDL). The graphic primitives that can be used with the printer are determined from the page description language used with the printer. To implement the instant invention, the PDL must support a pixelmap primitive. This primitive provides the facility for transmitting a pixel by pixel representation of a portion of the image to be printed to the printer at the resolution of the printer. This primitive allows a pixelmap, as illustrated in FIG. 8 at 801 to be inserted into the printer data stream 611.

The analogy of a printer model and its personality to an application and its document implies that a printer model can "read" many personality documents. However, in most cases there is only one personality document 601 per printer because a printer model represents one physical printer 605. In the case where the user has more than one printer of the same type (for example, two LaserWriter IIg printers), one personality document may be "shared" by multiple printers. The desktop printer 607 obtains user interface objects from the personality (the objects that present the user with printer configuration, features and settings that can be manipulated). The printer handler 603 gets imaging objects from the personality and calls on them to reproduce the document on the printer 605. Once the printer's dynamic state is added to its persistent store 604, both the desktop printer 607 and the printer handler 603 refer to it for the printer's configuration. A personality document 601 is created for each type of printer that a printer handler 603 is created for. The document is created and given to the developer of that type of printer. The developer can "edit" the instance data of objects or replace them with the printer specific implementations.

Printer Handler

Figure 7:
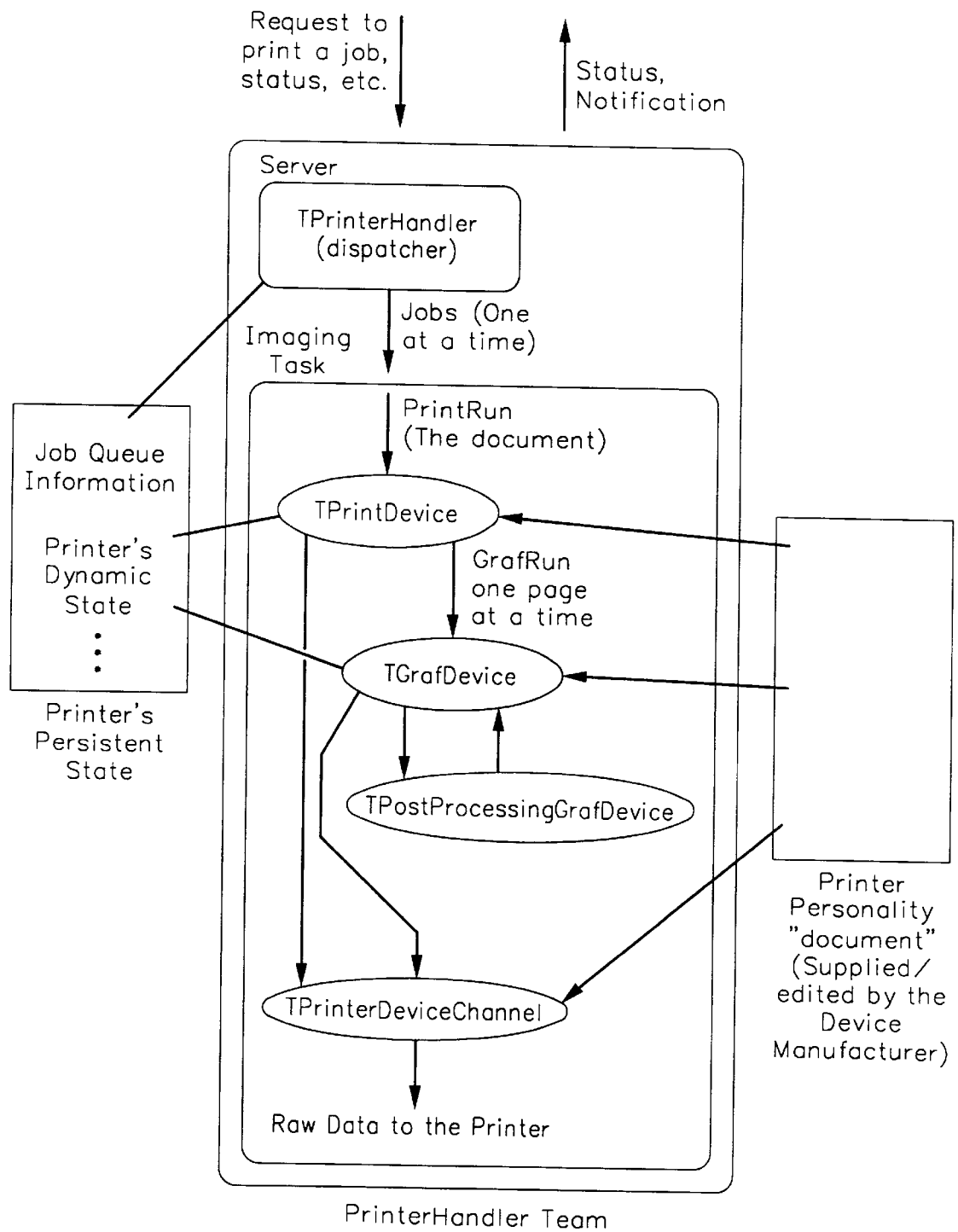
FIG. 7 details the printer handler components and their interactions in accordance with a preferred embodiment.

FIG. 7 details the printer handler components and their interactions in accordance with a preferred embodiment. The printer handler server team is started by the desktop printer when a print command is initiated by either dragging the document to it or selecting the Print command from one of the menus. The printer handler program creates a dispatch giving it a dispatcher and a message stream to be used as a transport between the client and the server. The dispatch task combines the transport and the dispatcher to create the printer handler server.

There is one printer handler task per physical printer. The printer handler consists of a dispatcher and an imaging task. The dispatcher is a task that handles requests to print jobs and sends them to the imaging task so that the server task is free to handle other requests (more print jobs, status queries, notification, etc.). The printer handler architecture allows for more than one task working on print jobs. Instead of having only one imaging task, the printer handler dispatcher can have a pool of tasks that access the job queue and pick up a job to process. This way, the printer handler can be processing multiple jobs at the same time. If the target printer can accept only one job at a time, only one imaging task will be talking to it at a given time. The multiple imaging tasks model works well when the destination is a spooler that can accept more than one job at a time. Each job in the queue will know the task that is processing it so things like abort, pause, etc. can function properly.

Printer Handler Server

The printer handler task is started by the desktop printer when a print command is initiated by either dragging the document to the printer icon or selecting the Print command from one of the menus. The desktop printer has a client class that starts up the server. The client class provides the protocol for calling "remote" procedures that are implemented in other objects, tasks, or servers. The printer handler program creates a transport and a dispatcher to create the printer handler server.

There is one printer handler task per physical printer. The printer handler consists of a dispatcher and an imaging task. The dispatcher handles requests to print jobs and sends them to the imaging task so that the server task is free to handle other requests (more print jobs, status queries, notification, etc.). The instant invention is within the imaging task. The printer handler architecture allows for more than one task working on print jobs. Instead of having one imaging task, the printer handler dispatcher has a pool of tasks that access the job queue and pick a job to process. This way, the printer handler can be processing multiple jobs at the same time. If the target printer can accept only one job at a time, only one imaging task communicates to it at a given time. The multiple imaging tasks function efficiently when the destination is a spooler that can accept more than one job at a time. Each job in the queue understands the task that is processing it so things like abort, pause, etc. are managed properly.

Printer Handler Imaging Task

Figure 15:
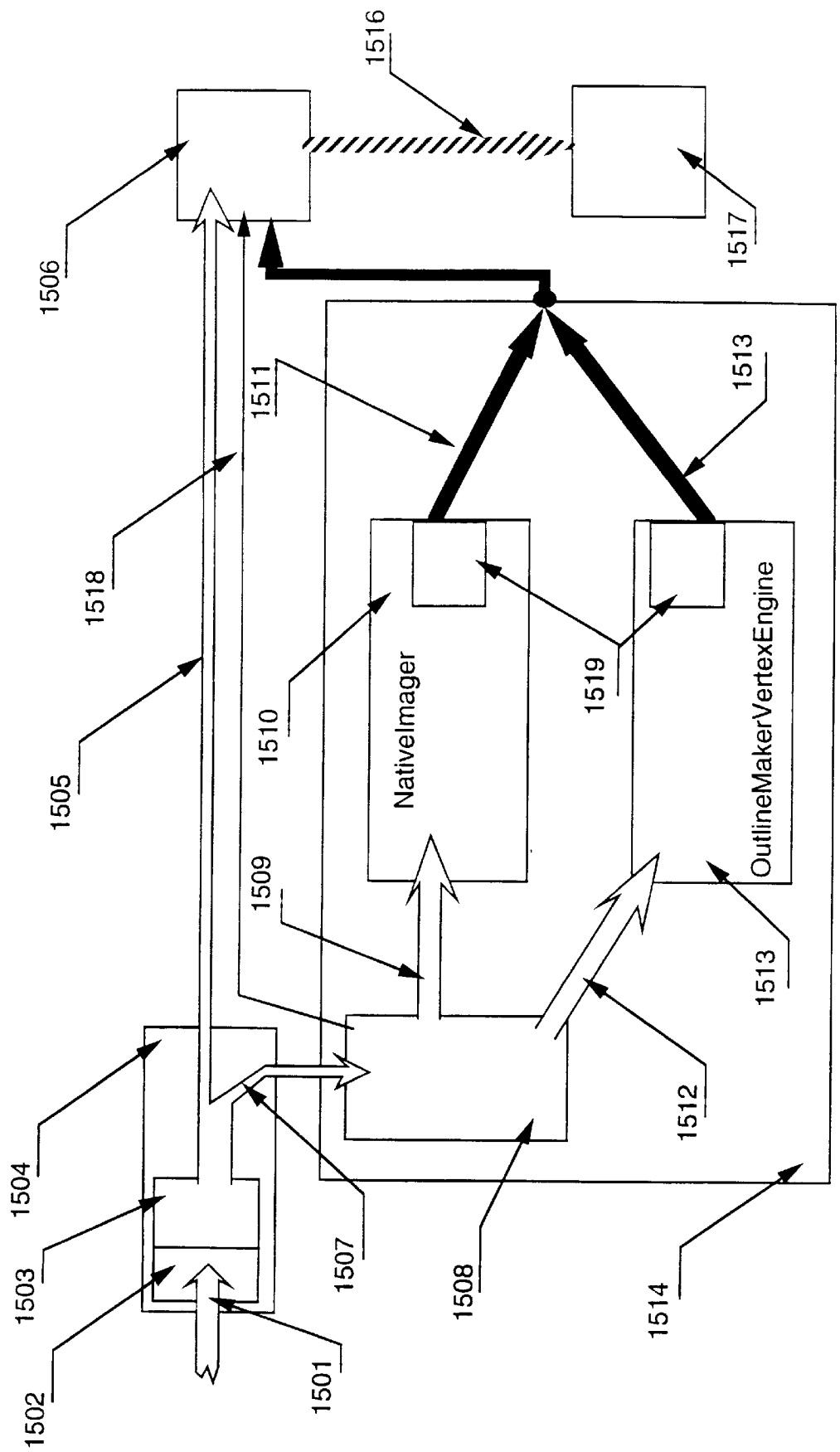
FIG. 15 is a schematic block diagram that represents the operation of the invention in accordance with a preferred embodiment.

The printer handler imaging task receives one print job at a time. It uses the developer customizable imaging objects to convert the source description of the document into a stream of data targeted for a particular printer. The portion of this task that is relevant to the invention is illustrated in FIG. 15. The imaging task obtains a spool file, shown schematically by arrow 1501, from the print job queue—the function of the de-spooler 1502—and passes it to the printer device object, TPrintDevice 1503. The printer device object 1503 reads the spool file and extracts individual pages from it and directs the conversion of the individual pages into the printer's imaging model using the printer's PDL. The imaging objects also perform the task of mapping the attributes requested by the print job (page size, media, color, fonts, etc.) to features actually available on the printer. This processing is achieved by consulting the printer's dynamic state maintained by the printer handler.

The imaging objects produce an output stream—the printer data stream 1516—that is sent to the output device. The framework for a specific type of printer defines an appropriate class. For example, the PostScript printer handler framework defines a class whose subclass talks with a printer using the AppleTalk Printer Access Protocol (PAP). A TCP/IP based printer can be easily supported by subclassing the same class.

Architecture of a Preferred Embodiment

Figure 16:
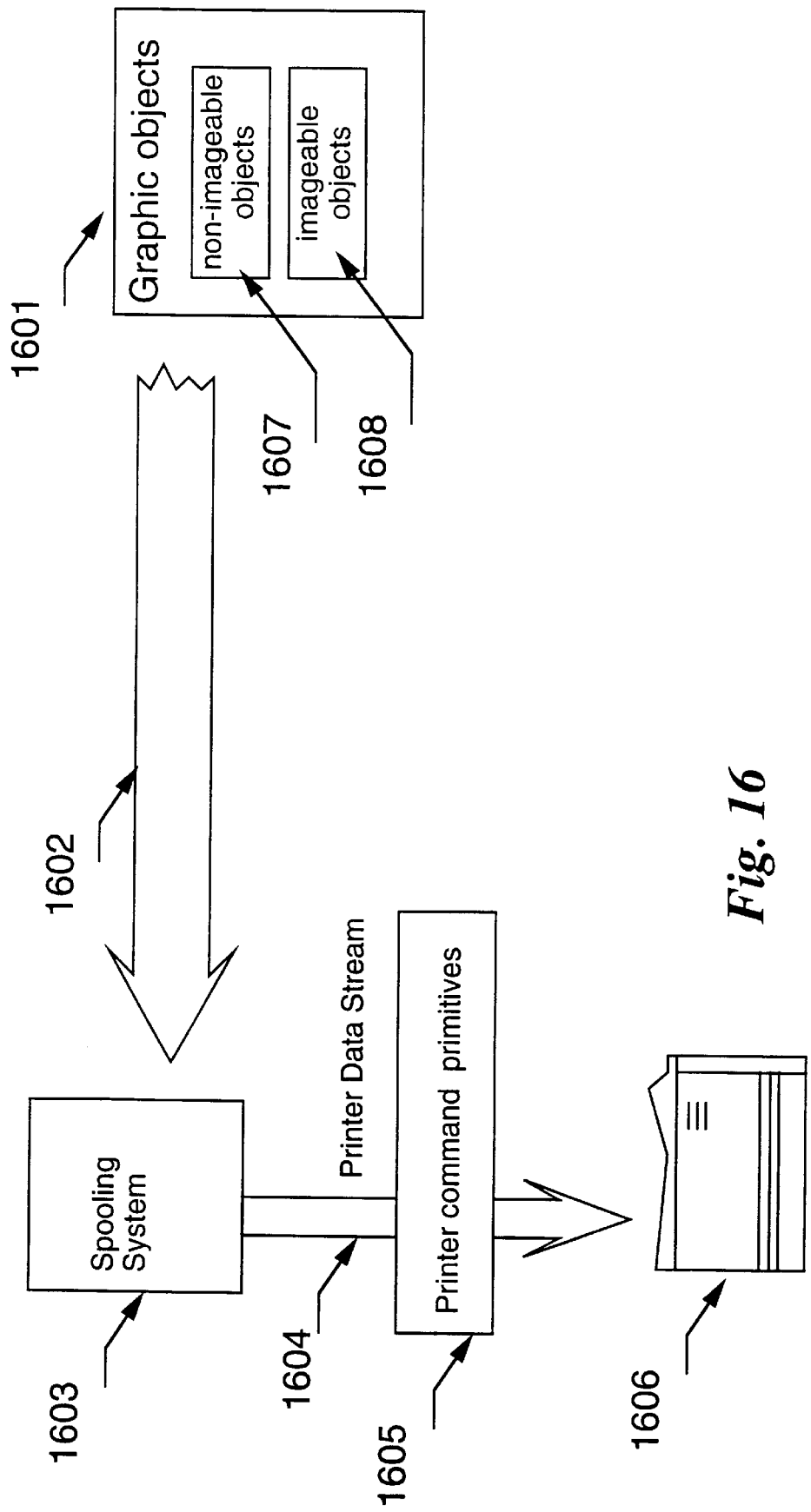
FIG. 16 is a schematic block diagram that represents the flow of graphical objects into a printing device in accordance with a preferred embodiment.

A preferred embodiment addresses the problem of converting extremely functional graphical objects into less functional display device primitives. An example printer device is illustrated in FIG. 16. Graphical objects 1602 are sent to a spooling system 1603 as indicated by arrow 1602. The spooling system 1603 converts the graphical objects 1602 into printer command primitives 1605 that are sent to printer 1606 as shown by arrow 1604. Graphical objects 1602 consists of two types of objects, non-imageable objects 1607 and imageable objects 1608. Imageable objects 1608 are directly transformed into printer command primitives 1605. Non-imageable objects 1607 cannot be directly transformed into printer command primitives 1605 and require significant processing to transform these graphical objects 1607 into printer command primitives 1605.

A preferred embodiment utilizes a process where the printer device object 1503, described above and illustrated in FIG. 15, determines which graphical images are non-imageable by the printer device, determines the complexity of the non-imageable graphical object and analyzes the best method to convert the non-imageable object to imageable object(s). The following description is directed toward a PostScript capable printer, but as would be recognized by one skilled in the art, the description and the invention are not limited to PostScript capable printers, and supports display devices.

PrintServer 506 in FIG. 5 sends a notification to TPrinterHandler 1504 that a print job exists in its queue. TPrinterHandler 1504 opens the spooled file on the intermediate storage 522 device using de-spooler 1502 and passes the spooled file to TPrintDevice 1503. TPrintDevice 1503 reads the spool file, and sends the graphical objects—a page at a time—to TPostScriptGrafDevice 1506 (as shown schematically by arrow 1505). TPostScriptGrafDevice 1506 ignores non-imageable objects, but converts the imageable objects in the page into PostScript PDL commands that make up the printer data stream 1516 that is sent to print device 1517. The page is then passed to the TPostProcessingGrafDevice object 1514. TPostProcessingGrafDevice 1514 at box 1508 rereads the page's graphical objects searching for nonimageable graphic objects. If the page consists only of imageable objects, the page definition for the printer data stream is closed as shown schematically by arrow 1518. If the page contains a non-imageable graphical object, the graphical object and its bounds are saved and its complexity initialized.

The complexity is further adjusted by detecting which imageable objects, previously defined in the page, intersect with the non-imageable object. TPostProcessingGrafDevice 1514 at box 1508 rereads the page graphical objects once again to detect which of the imageable objects intersect with the bounds of the saved non-imageable graphical object. The complexity of the non-imageable object is increased for each intersection depending on the complexity of the object intersecting the bounds of the non-imageable object. Thus, developing a measure of complexity and an association of what imageable objects interact with the non-imageable object for that page. This continues for all non-imageable graphical objects defined in the page.

Once all of the page's non-imageable graphical objects and the imageable objects that intersect with the nonimageable objects have been analyzed, the complexity of each saved grouping is compared to the complexity threshold of the printer. If the complexity is more than the threshold, the saved grouping is sent to the NativeImager object 1510 as shown by arrow 1509. Otherwise, the saved grouping is sent to the OutlineMakerVertexEngine object 1513 as shown by arrow 1512. The complexity is determined by the number of line segments required to draw the image. Because the printer has limits on the number of line segments per page (this limit is one of the components used to determine the printer's threshold) attempting to draw more line segments than that limit will cause errors in the resultant printed image. Thus the invention monitors the number of line segments per page (the complexity) and compares this with the capabilities of the printer (the threshold).

The NativeImager object 1510 constructs a rectangular pixelmap of the image, in RAM 306, defining each pixel the image to be printed. This pixelmap is created at the resolution of the printer as determined from the Printer Personality Document and/or the Printer's Persistent Data. The NativeImager object 1510 also defines a clipping region that outlines the image within the rectangular pixelmap. This clipping outline is used to effectuate only the image defined within the rectangular pixelmap instead of the entire rectangular pixelmap so that the pixelmap can be applied without affecting the prior images that overlap the rectangular area of the pixelmap but that do not intersect with the image contained within the pixelmap. This rectangular pixelmap and a clipping outline are appended to the printer data stream 1516 for the page by sending the rectangular pixelmap and clipping outline to TPostScriptGrapfDevice 1506 as shown schematically by arrow 1511.

Figure 11:
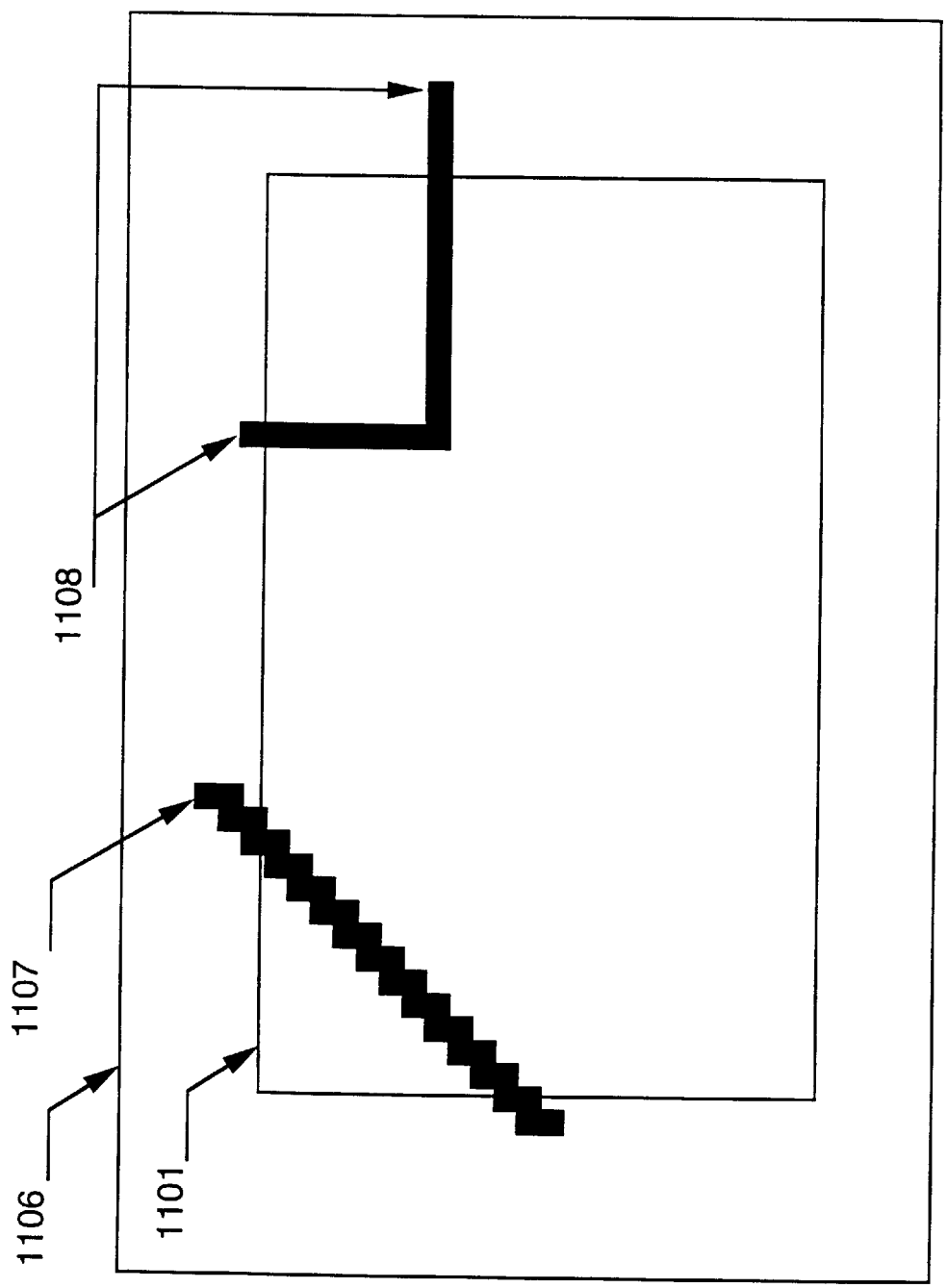
FIG. 11 represents an existing image upon which the clipped image will be applied in accordance with a preferred embodiment.
Figure 12:
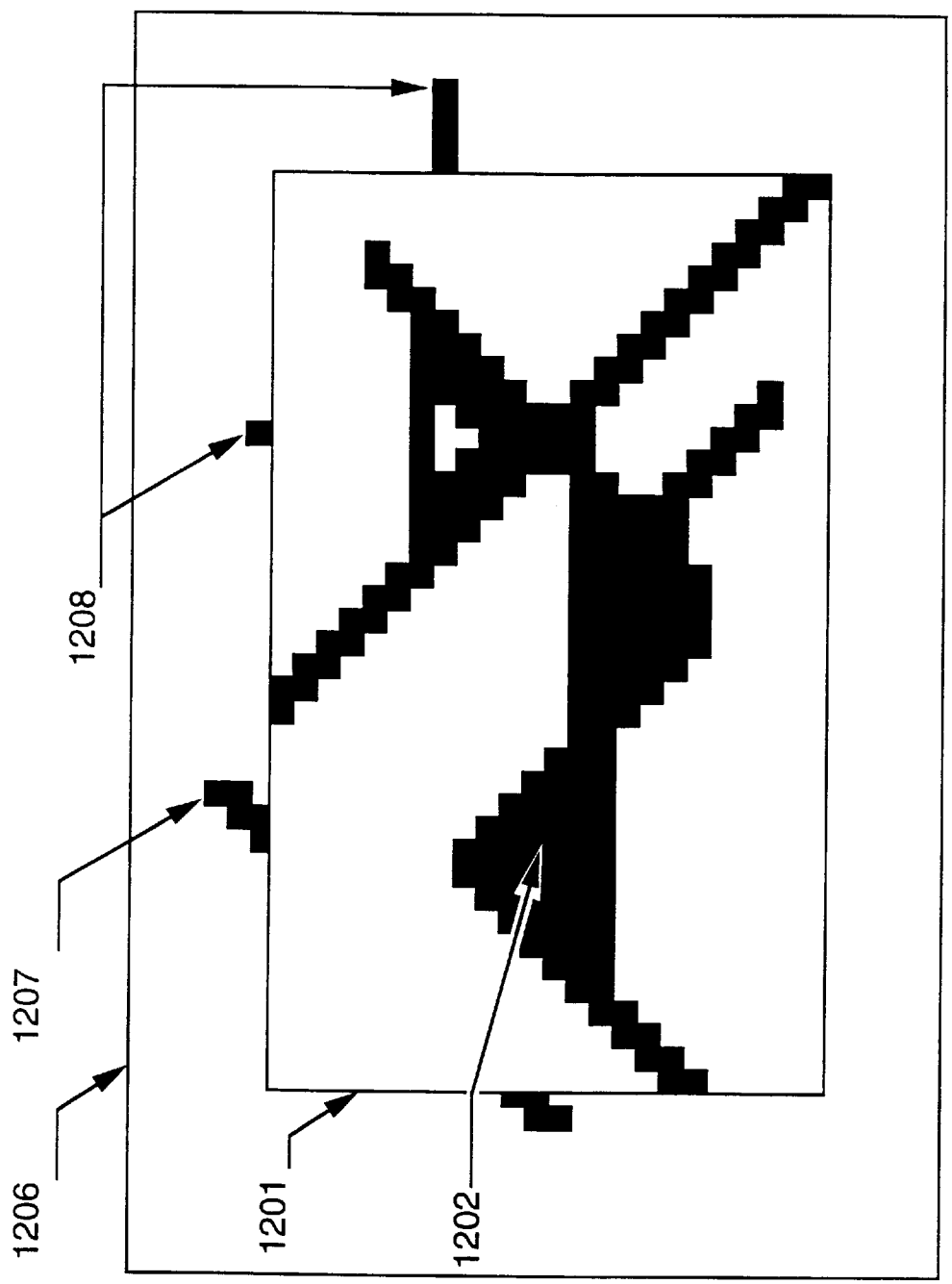
FIG. 12 indicates the result of applying the non-clipped image to the previous image.

FIG. 8 shows a pixelmap 801 containing a pixelated complex image 802. This image is for illustration only, it is not intended to indicate a high complexity image. The pixel indicated by arrow 803, although part of the pixelmap, is not needed to render the pixelated image 802. In fact, if the pixelmap 801 is actually applied over an existing image in a manner that applies pixel 803, pixel 803 could obscure the underlying image. The affect of this is shown in FIGS. 11 and 12. In FIG. 11, box 1106 indicates the partially imaged page that already contains lines 1107 and 1108. Box 1101 indicates where the pixelmap will be placed and showing that the pixelmap will overlap parts of lines 1107 and 1108. FIG. 12 shows the result of placing the pixelmap 1201 over the partially imaged page 1206 showing that lines 1207 and 1208 are obscured by pixelmap 1201.

Figure 9:
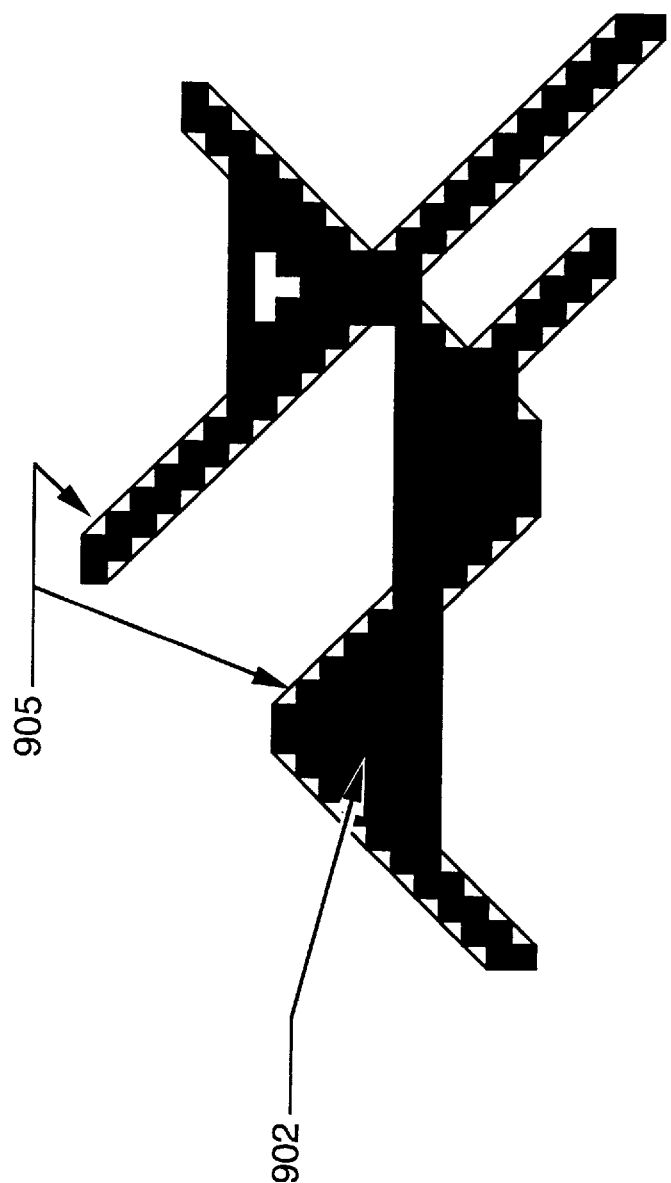
FIG. 9 shows how a clipping region is used to outline an image in accordance with a preferred embodiment.
Figure 10:
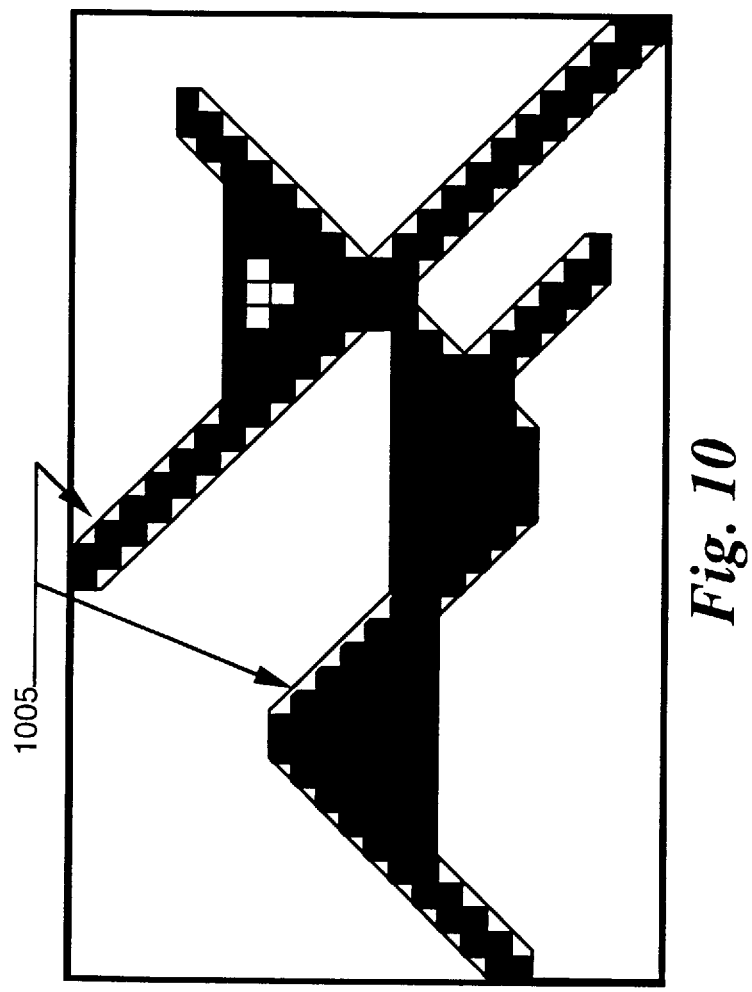
FIG. 10 shows the affect of the clipping region when used to clip the image in accordance with a preferred embodiment.

FIG. 9 shows a clipping region 905 surrounding the pixelated complex image 902. FIG. 10 shows just the clipping region 1005. The purpose of developing clipping region 905 is to allow the rectangular pixelmap 1201 to be applied to the page without affecting any area of the page other than the area of the complex pixelated image 1202.

As mentioned above, FIG. 12 shows image 1206 that would be partially covered by rectangular pixelmap 1201 if the pixelmap were simply applied over image 1206. With the clipping region 1205 applied to the pixelmap 1201 only the portion of the pixelmap 1301 that actually contains the image is composited into the image 1206. For example, line segment 1207 would have been overlaid by the application of the pixelmap if applied without the clipping region. Thus obliterating portions of line segment 1207. Because of the gap 1204 is transparent, portions of line 1208 must be included in the pixelated image 1202.

Figure 13:
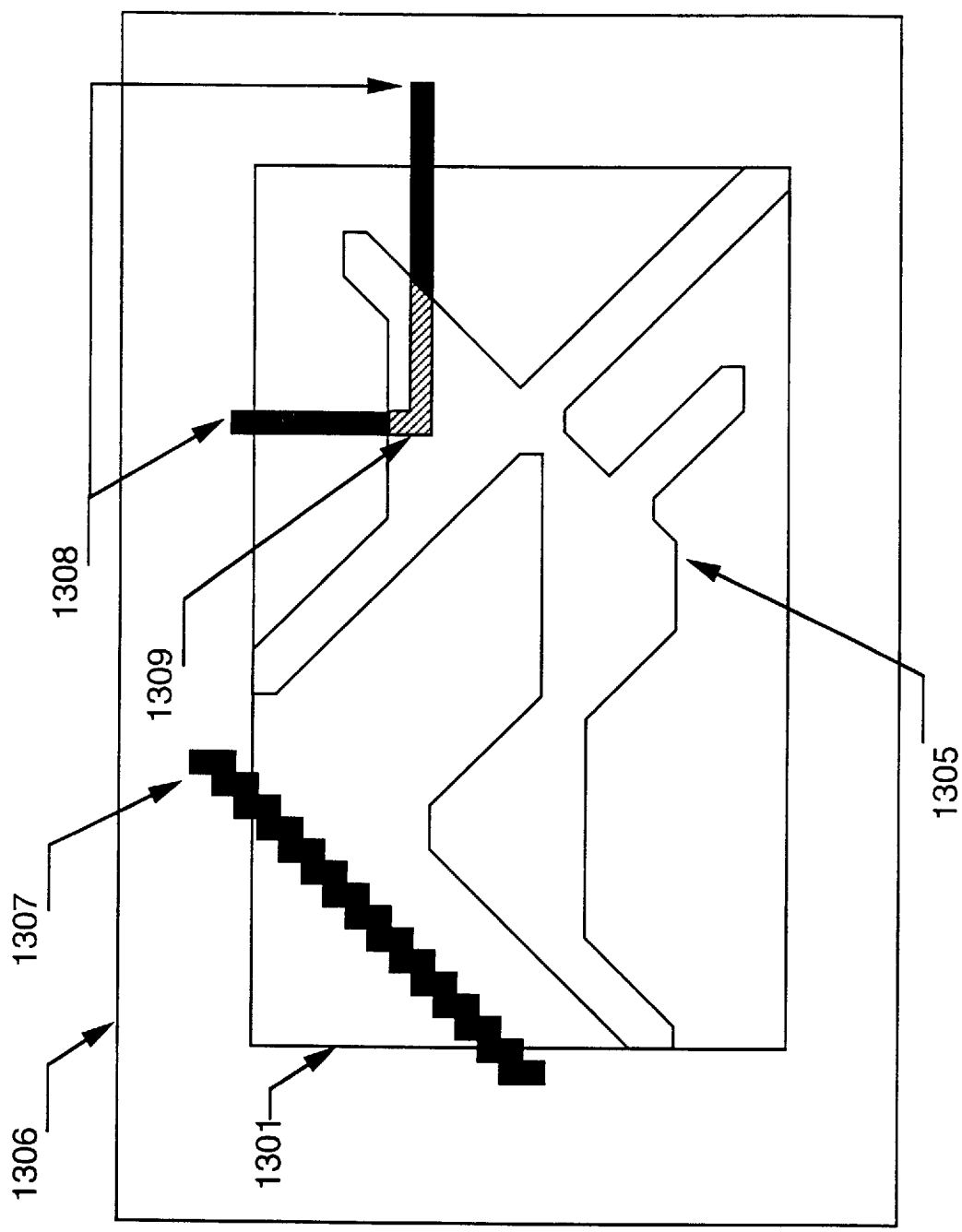
FIG. 13 indicates which portions of the previously existing image are affected by applying the clipping region in accordance with a preferred embodiment.

FIG. 13 demonstrates the result obtained by clipping pixelmap 1301. Now line 1307 is not affected by the application of pixelmap 1301. However, line 1308 is affected as the line segment 1309 is still obliterated by clipping region 1305. Thus in the generation of the pixelated image such as 802 shown in FIG. 8, previously imaged objects that intersect with image 802 must also be imaged into the image 802. Thus resulting in the image shown in FIG. 14.

Figure 14:
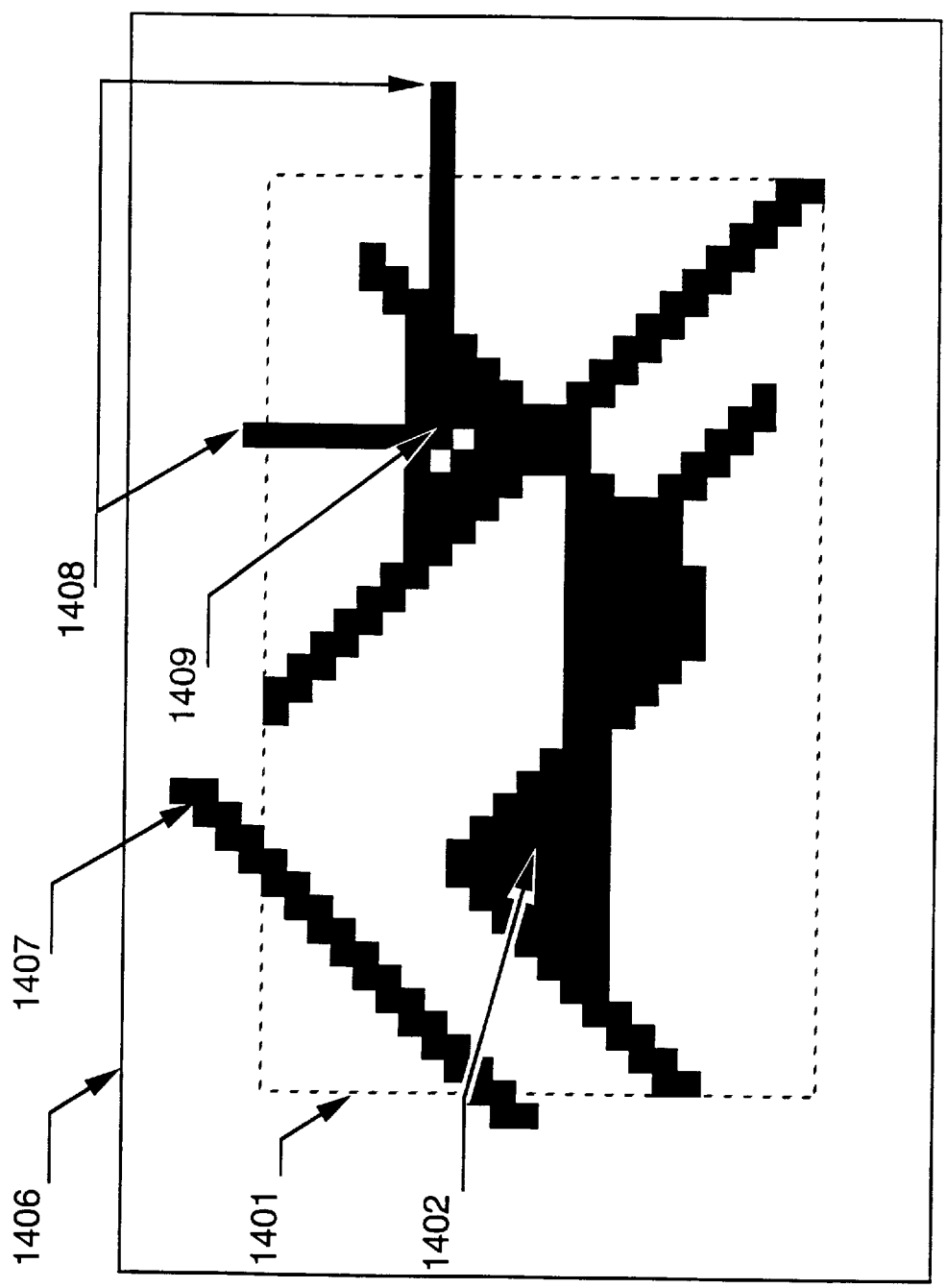
FIG. 14 shows the composite result of applying the pixel image along with the composited underlying image, and the clipping region in accordance with a preferred embodiment.

FIG. 14 shows the final composited image 1406. Now because of the insertion of line segment 1409 into the pixelated image 1402, the image is complete. The dotted box 1401 indicates the placement of the pixelmap, but the dotted lines are not part of the composited image. Thus, the non-imageable object has been transformed into a collection of imageable objects corresponding to the original object 1519.

The OutlineMakerVertexEngine object 1513 transforms the original graphical object into a collection of imageable objects corresponding to the original object 1519 that can be processed by TPostScriptGrapfDevice 1506 as compared to the original graphical object that cannot be processed by TPostScriptGrapfDevice 1506. This collection of objects is sent to TPostScriptGrapfDevice 1506 as indicated by arrow 1515 where the imageable objects are converted into PostScript and appended to the printer data stream 1516 for the page.

Figure 17:
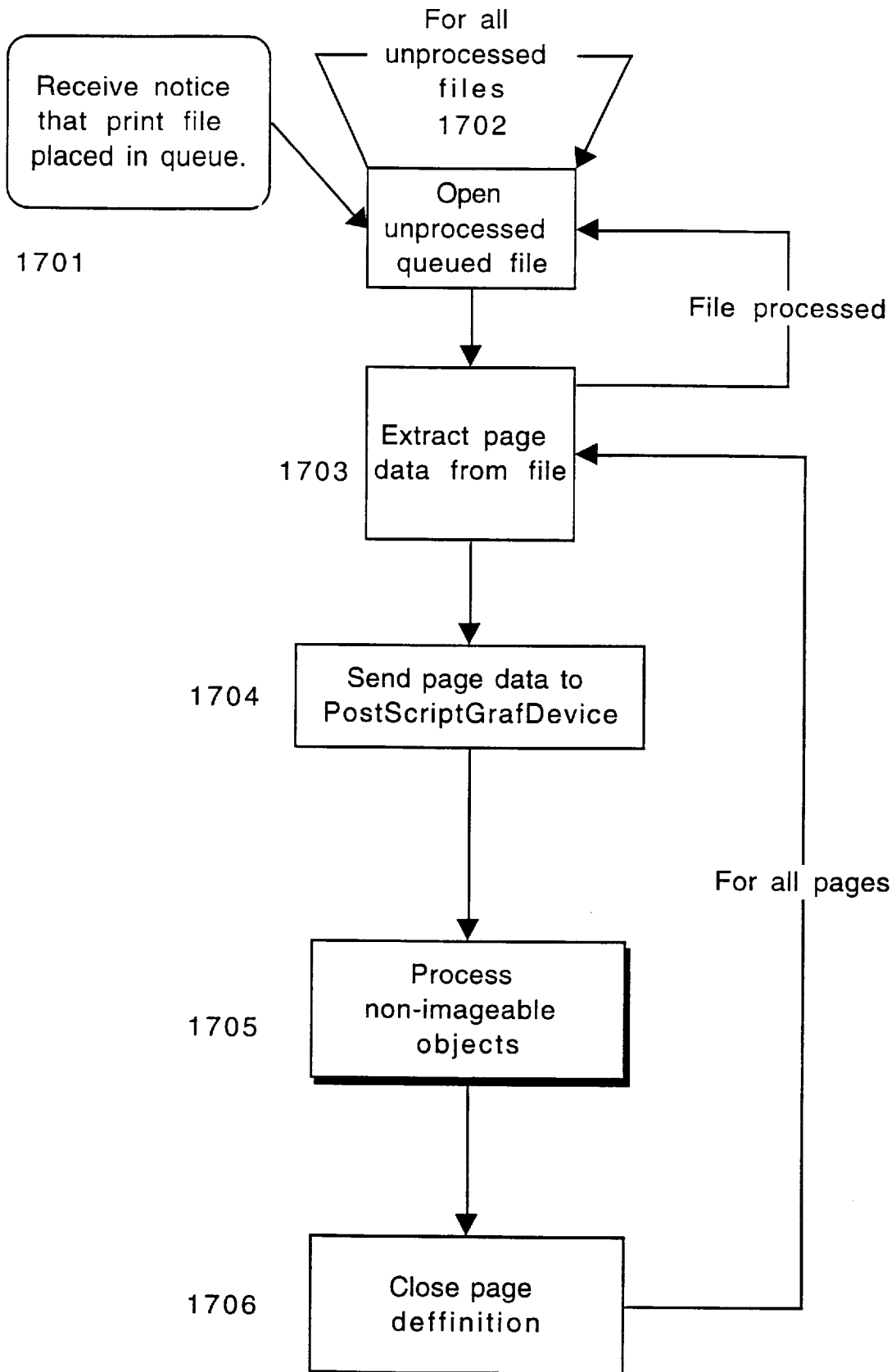
FIG. 17 is a flowchart illustrating the overall operation of a preferred embodiment.

FIG. 17 is a flow chart representation of the embodiment described above. Terminal 1701 is entered when the spooling system notifies the printer handler imaging task that file is ready to print. In step 1702, the file is opened and passed to step 1703. Step 1702 continues to administrate additional notifications from the spooling system of any additional files to be printed. After the current file is completely processed, step 1702 opens the next queued file and repeats the operation described below. If no additional files are to be printed the printer handler imaging task becomes quiescent.

Step 1703 reads the file and indicates page boundaries within the file. The information for each page is passed to step 1704. Step 1704 sends the page date to the PostScript-GrafDevice object where the page date is converted to the PostScript page description language (PDL). The same page information is sent to step 1705 where any non-imageable graphical objects are transformed into imageable graphical objects and, as will be shown below, transformed into the PostScript PDL. Finally, step 1706 closes the PDL page, and the next page is processed starting at step 1703. This process repeats for all pages in the file. When the file is completely processed, step 1703 communicates with step 1702 to begin processing the next spooled file if any.

Figure 18:
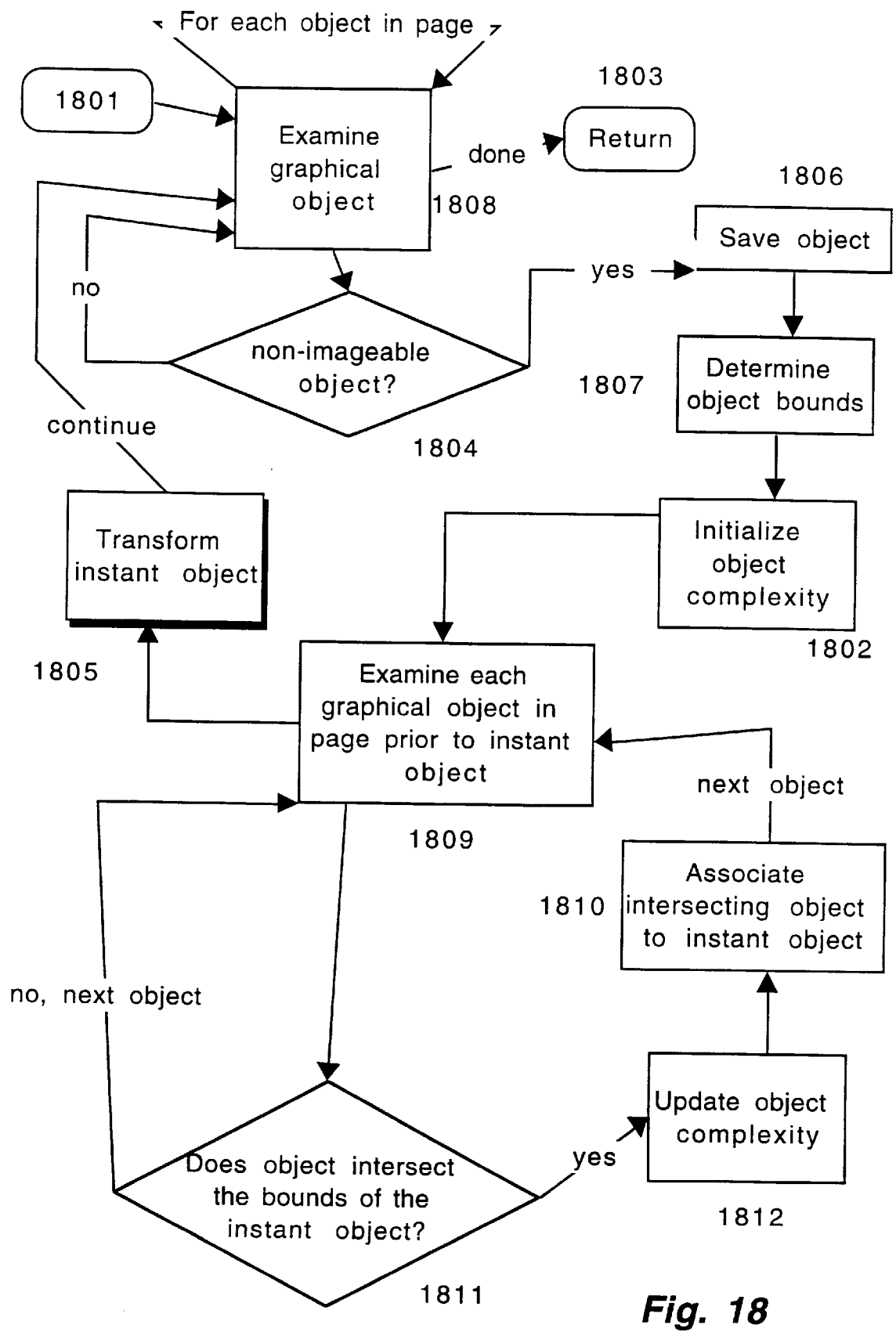
FIG. 18 is a flowchart describing the method of processing printer non-imageable graphical objects in accordance with a preferred embodiment.

The details of step 1705 are shown by the flowchart shown in FIG. 18. Processing starts at terminal 1801. Step 1808 examines each graphical object in the page. Decision 1804 determines whether the object is an imageable or non-imageable object. If the object is imageable, the next object is examined. Alternatively, processing continues at step 1806 where the non-imageable object is stored, its bounds determined by step 1807, and the complexity of the non-imageable object initialized by step 1802. Next step 1809 examines all previous objects in the page to determine which objects intersect with the bounds of the non-imageable object saved in step 1806. This determination is made at decision 1811. If an object is found that intersects the bounds of the non-imageable object, the non-imageable objects complexity is updated at step 1812 and the intersecting object is associated with the non-imageable object in step 1810. This process repeats until all the objects in the page prior to the non-imageable object are examined, the complexity of the non-imageable object determined, and all intersections with prior objects with the non-imageable object associated with the non-imageable object. Step 1805 transforms the non-imageable object into the PDL as will be described below. After the non-imageable object is transformed, the process continues at step 1808 until the entire page is examined.

Figure 19:
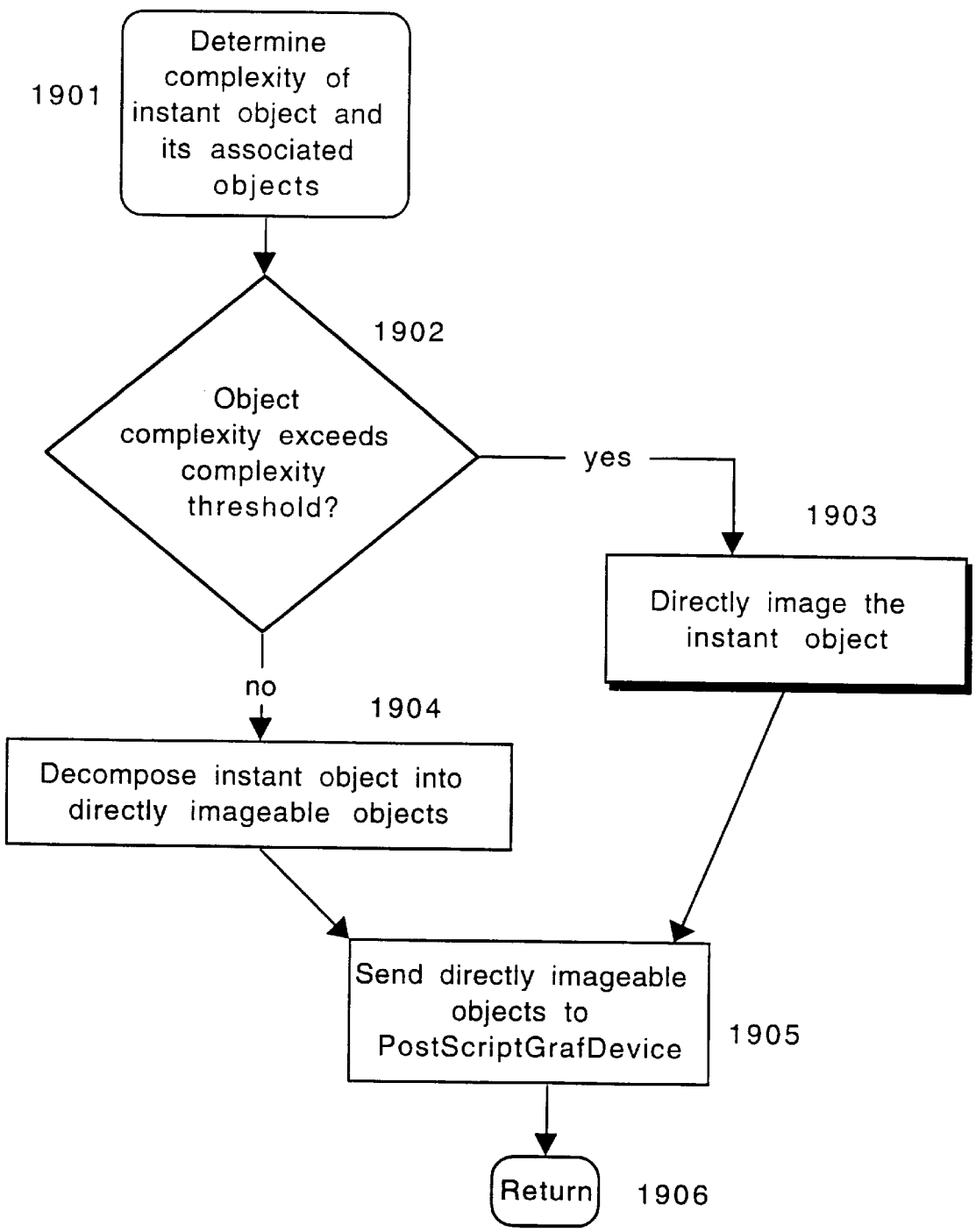
FIG. 19 is a flowchart illustrating the test determining if the non-imageable object is to be transformed into a collection of imageable objects or into a pixel object in accordance with a preferred embodiment.

FIG. 19 contains a flowchart detailing the operation of step 1805. Entry is through terminal 1901. Decision 1902 compares the complexity of the non-imageable object to the complexity threshold of the device associated with the printer handling imaging task. If the complexity is below the threshold, processing continues at step 1904 where the non-imageable object is decomposed in to a collection of imageable objects. These imageable objects converted to the PostScript PDL by PostScriptGrafDevice as indicated by step 1905. Alternatively, if the complexity of the non-imageable object is not below the threshold, processing moves to step 1903 where a pixelated image is created from the non-imageable object and its associated intersecting objects. The pixelated image and clipping region objects are also converted to the PostScript PDL at step 1905. Finally, processing returns through terminal 1906.

Figure 20:
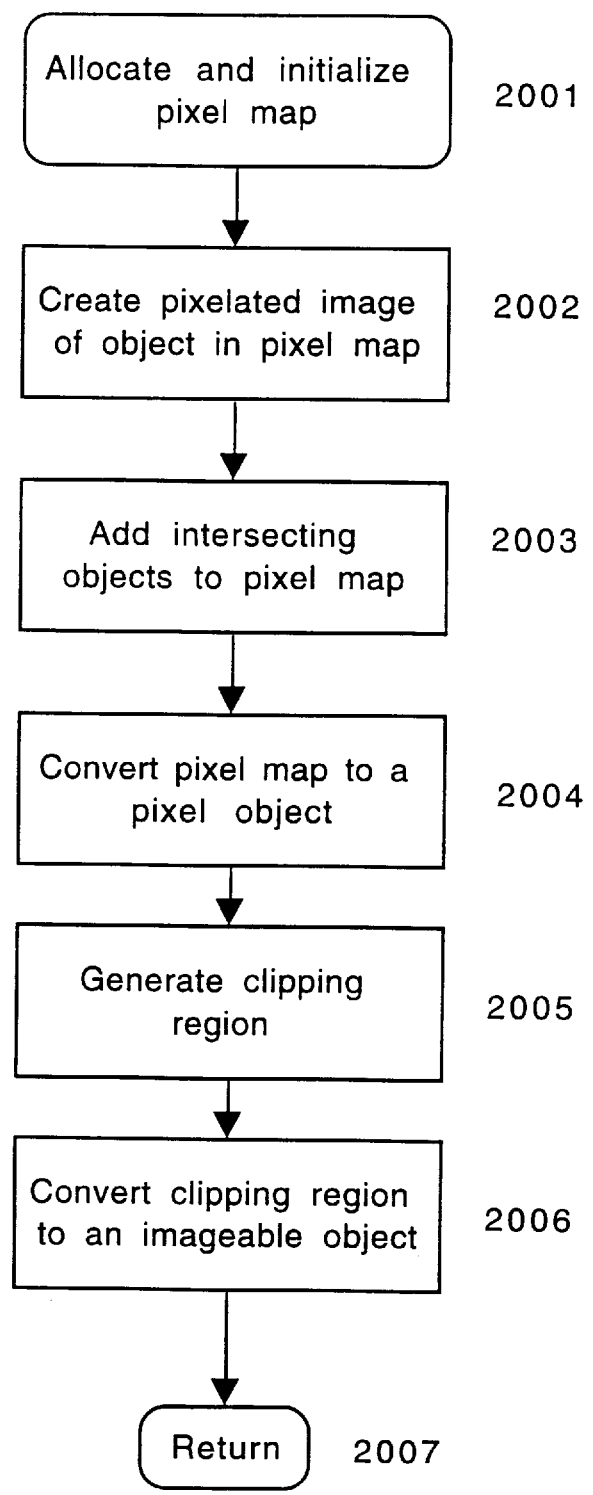
FIG. 20 is a flowchart illustrating the steps to create the pixel object in accordance with a preferred embodiment.

Processing for step 1903 is shown by the flowchart on FIG. 20. Entry is via terminal 2001. Step 2002 creates a pixel map of the printer non-imageable object. Step 2003 adds the intersecting portions of the intersecting objects to the pixel map. The pixel map is converted to a pixel object in step 2004. Step 2005 creates a clipping object that outlines the pixelated image of the non-imageable object and the intersecting portions of the associated objects. This clipping region is finally converted to a clipping object in step 2006. Processing returns through terminal 2007.

Printer's Persistent Data

The printer handler is responsible for keeping track of the printer's persistent data, in particular, its job queue and dynamic state. The dynamic state contains things like the current media/tray setting, current color mode (2, 3 or 4 colors), printer resolutions (for variable resolution printers), etc. Since each printer would want to save different things in its dynamic state, there is a class that developers can subclass to add printer specific features. For the most part, it is this class that will be streamed out to the printer's persistent data store. The default implementation of the persistent data store will be a dictionary, although the developer is free to use some other storage scheme. Since the printer's state is persistent, the printer handler can be easily restarted in case of a crash or system shutdown.

The printer state, which is part of the printer model's store, is updated when the printer handler images a job to it and finds that the state has changed. This scheme works when the printer handler has two-way communication available with the printer. In cases when two-way communication is not available, the printer handler will rely on the printer's static configuration.

Printer Personality Document Excerpts

The following are selected entries from an Adobe PostScript Printer Description File which illustrates the features of the PPD that can be used to determine a PostScript printer's attributes.

```
*FormatVersion: "4.0"
*FileVersion: "2.8"
*PCFileName: "A_PNT518.PPD"
*LanguageVersion: English
*Product: "(LaserWriter Personal NT)"
*PSVersion: "(51.8) 0"
*ModelName: "Apple LaserWriter Personal NT"
*NickName: "LaserWriter Personal NT v51.8"
```

The above excerpt provides basic information regarding the format of the PPD and specific information about the associated printer. Specifically, the product name and the version of PostScript supported by the printer.

```
*% General Information and Defaults ===============
*FreeVM: "402366"
*LanguageLevel: "1"
*ColorDevice: False
*DefaultColorSpace: Gray
*VariablePaperSize: False
*FileSystem: False
*Throughput: "4"
...
*DefaultResolution: 300dpi
...
```

The above provides specific information regarding the characteristics of the printer. These include the "FreeFM" which limits the complexity of a PostScript job. The "LanguageLevel" value determines what printer command primitives are supported by the printer and how many line segments are allowed in a path, and the total number of line segments allowed on a page. The above also indicates the printer's default resolution. This value is used to determine the size of a pixelmap that will hold a non-imageable object. Additional information includes whether the printer is a color device, whether the printer includes its own file system, and the printer's maximum throughput in pages per minute.

Printer Handler Classes

A discussion of the classes that implement the printer handler framework is provided below.

| TPrinterHandler |
|---|

```
class TPrinterHandler : public MRemoteDispatcher {
    public:
        TPrinterHandler ( );
        virtual~TPrinterHandler( );
    private:
    // Server Requests
    // Every XXXRequest method unflattens arguments, if any, and then
    // calls the corresponding HandleXXX method. It then calls
    // ReturnSuccess and flattens results to the result stream.
        // Job Queue Management
        // Requests that apply to all jobs in the queue
            void    GetAlljobsRequest ( );
            void    AbortAllJobsRequest( );
            void    DeferAllJobsRequest( );
            void    UndegerAllJobsRequest( );
            void    DeferAllJobsUntilRequest( );
        // Requests that apply to one job in the queue
            void    AddJobRequest( );
        // RemoveJobRequest will abort the job if it is currently being processed.
        // Otherwise, the job will be removed from the queue.
            void    RemoveJobRequest( );
            void    PauseJobRequest( );
            void    DeferJobRequest( );
            void    UndeferJobRequest( );
        // Update printer's state
            void    UpdateDynamicPrinterDataRequest( );
        // return status of a job
            void    GetStatusOfJobRequest( );
        //
        // Subclasses can override the following HandleXXX methods.
        // HandleXXX are called from the corresponding request methods.
        //
        // Job Queue Management
        // Requests that apply to all jobs in the queue
        virtual void    HandleGetAllJobs( );
        virtual void    HandleAbortAllJobs( );
        virtual void    HandleDeferAllJobs( );
        virtual void    HandleUndeferAllJobs( );
        virtual void    HandleDeferAllJobsUntil( );
        // Requests that apply to one job in the queue
        virtual void    HandleAddJob( );
        // RemoveJobRequest will abort the job it it is currently being processed.
        // Otherwise, the job will be removed from the queue.
        virtual void    HandleRemoveJob( );
        virtual void    HandlePauseJob( );
        virtual void    HandleDeferJob( );
        virtual void    HandleUndeferJob( );
        // Update printer's state
        virtual void    HandleUpdateDynamicPrinterData( );
        // return status of a Job
        virtual void    HandleGetStatusOfJob( );
        // for TPrinterHandlerCaller only
        typedef enum {
            kGetAllJobsRequest, kAbortAllJobsRequest, kDeferAllJobsRequest,
            kUndeferAllJobsRequest, kDeferAllJobsUntilRequest,
            kAddJobRequest, kRemoveJobRequest, kPauseJobRequest,
            kDeferJobRequest, kUndeferJobRequest,
            kUpdateDynamicPrinterDataRequest,
            kGetStatueRequest
        };
        friend class TPrinterHandlerCaller; // so it can use enums above.
    protected:
        // Get the imaging task to send jobs to
        virtual TPrinterImagingTask*    GetImagingTask( );
        // Get the job queue for this printer
        virtual TDeque* GetPrintJobQueue( );
        //  . . . . . . . Methods to communicate with the imaging task
        //  . . . . . . .
```

TPrinterHandler is a base class that provides protocol for dispatching server requests. The corresponding client class TPrinterHandlerCaller is described later. TPrinterHandler maintains a job queue for the printer. This queue is semaphore protected to allow concurrent access by the printer handler and an imaging task.

GetImagingTask creates a TPrinterImagingTask giving it an exchange to communicate with (an exchange provides a place to send messages to and receive messages from). TPrinterImagingTask is given one job at a time to process (by AddJobRequest). When the job is finished, it notifies the printer handler so it can decide what to do with the job.

GetStatusOfJobRequest returns status of a job in the job queue. For the job being processed currently, the status reported is the "global" job status described earlier. There are two ways this could be implemented. One way is for the TPrintDevice subclass to post the status (perhaps a TText) periodically at a global location which the printer handler returns to the client in GetStatusRequest method. Another way is to implement a helper task to get status from the TPrintDevice subclass. For any other job (not currently being processed), the status that is returned might be the number of pages in the job (if that's appropriate), how far down the queue this job is, etc.

---

TPrinterHandlerCaller

---

```
class TPrinterHandlerCaller : protected MRemoteCaller {
    public:
        TPrinterHandlerCaller(TSenderTransport*);
        virtual~TPrinterHandlerCaller( );
        // Remote requests
        // These are called by TPrinterModel's command handlers
        virtual TPrintJobQueue*  CreateJobIterator( );
        virtual void    AbortAllJobs( );
        virtual void    DeferAllJobs( );
        virtual void    UndeferAllJobs( );
        virtual void    DeferAllJobsUntil( );
        virtual void    AddJob(TPrintJobSurrogate&);
        virtual void    RemoveJob(const TPrintJobSurrogate&);
        virtual void    PauseJob(const TPrintJobSurrogate&);
        virtual void    DeferJobRequest(const TPrintJobSurrogate&);
        virtual void    UndeferJobRequest(const TPrintJobSurrogate&);
        virtual void    GetStatus(TText&);
        // . . . . .
    MRemoteCallerDeclarationsMacro(TPrinterHandlerCaller);
};
```

A TPrinterHandlerCaller is instantiated in the printing task (the task that initiates printing, probably a compound document) by the TPrinterModel. It uses a transport to send a request to the printer handler task. The transport can be local or remotely located. Thus, the printer handler to be on a remote machine. A reference to an already-registered service (like a network printer) required by the transport is known to the printer that the document is being printed on. When the printer handler is remote, TServiceReference is obtained from the network.

TPrinterHandlerCaller's methods are called by the printer model's commands which are called by the document framework in response to user actions.

---

TPrinterImagingTask

---

```
class TPrinterImagingTask : public TTaskProgram {
    public:
        TPrinterImagingTask (TIPCExchange*);
        virtual         ~TPrinterImagingTask( );
        // TTaskProgram override
        virtual void    Run( );
        // Support methods to handle different types of messages from the
        // Printer Handler.
        // The messages that this task will receive are:
        //      AbortJob
        //      PauseJob
        //      GetStatus
        //      ProcessJob
        //      etc.
        // . . . . . .
};
```

TPrinterImagingTask, which is created by the printer handler, performs the task of imaging print jobs and supplying progress information for the same. The constructor receives a TIPCExchange that the imaging task uses to communicate with the printer handler. As far as the communication between the printer handler server and the imaging task is concerned, there are two possibilities. One is to use the exchange to receive messages and dispatch them based on the message id that the printer handler attaches to the header. Another way to do Inter-Process Communication (IPC) is to use wait groups to handle the dispatching automatically when you provide message handlers for each type of message. The second method makes the implementation more structured (avoids a switch statement) but involves writing more code.)

ProcessJob gets a TPrintJobSurrogate as a parameter. Using the TPrintJobSurrogate, the imaging task gets to the print job. A print job has a reference to the printer's persistent data (a TDiskDictionary) that keeps the spooled image of the document, a reference to the printer that the job was targeted to, etc. The printer reference (lets call it TPrinterIdentity) is actually a reference to the TPrinterModel's data. Using this data the imaging task can get to the TPrintDevice subclass for the printer. The imaging task gets the spool stream and the job description (TPrintJobDescription) out of the job's persistent data and asks the print device to process it.

---

TPrintDevice

---

```
class TPrintDevice : public MCollectible {
    public:
        virtual ~TPrintDevice( );
// Don't override these: override the HandleXXX methods below.
        virtual void RenderPrintRun(const TPrintRun&,const TPrintJobDescription&,
                        const TPrinterIdentity&);
        virtual void RenderPage(const TGrafRun& grafRun, const TPageDescription&,
// MCollectible support
        virtual TStream& operator<<=(TStream& fromwhere);
        virtual TStream&operator>>=(TStream& towhere) const;
```

```
                              TPrintDevice virtual Boolean IsEqual(const MCollectible *) const;
    protected
        TPrintDevice& operator=(const TPrintDevice&);
        // You can use these in the HandleXXX methods below to get current
        // page/Job information.
        virtual TPrintRun* GetPrintRun( );
        virtual const TPrintJobDescription* GetPrintJobDescription( );
        virtual TGrafRun* GetGrafRun( );
        virtual TPageDescription* GetPageDescription( );
        // The following methods are called as a result of RenderPrintRun( ).
        // Don't call these directly: call RenderPrintRun( ).
        // You may override these. If you override Begin/EndPrintRun, then
        // be sure to call these base class methods as the first thing
        // in your override implementations.
        virtual void    HandleBeginPrintRun( );
        virtual void    HandleRenderPrintRun( );
                        // Default implementation goes through the printrun in
                        // forward order and calls RenderPage for each page.
        virtual void    HandleEndPrintRun( );
        // The following methods are called as a result of RenderPage( ).
        // Don't call these directly: call RenderPage( ).
        virtual void    HandleBeginPage( );
        virtual void    HandleRenderPage( ) = 0;
        // You must override this to convert the page to the printer imaging model.
        virtual void    HandleEndPage( );
    protected:
        TPrintDevice( );
};
```

TPrintDevice converts a document to the printer imaging model. It provides an abstract interface to access page and job information and to process the job (a Print Run) and each page. Subclasses implement HandleRenderPage method to convert the page data to the printer imaging model. TPrintDevice is one of the objects that will be included in the personality document that the developer can edit or subclass. Therefore, it is possible for the developer to supply an implementation for converting the document to the printer imaging model. TPrintDevice is resurrected from the printer personality by the imaging task. RenderPrintRun is called with a TPrintRun, TPrintJobDescription, and a TPrinterIdentity. RenderPrintRun calls HandleBeginPrintRun, HandleRenderPrintRun, and HandleEndPrintRun. The reason for providing the begin and end methods is so that the subclasses can send some global commands to the printer before and after the document is processed. The default implementation of HandlePrintRun goes through the printrun in forward order and calls RenderPage for each page. Subclasses can override this to "play" the document in any random order they like. RenderPage calls HandleBeginPage, HandleRenderPage and HandleEndPage. Again, the reason for providing the begin and end methods is so subclasses can send page level global commands to the printer.

The TPrintJobDescription parameter, passed in the constructor, gives the user selected print time options. The print device maps the user's choice to what is actually available on the printer. It uses the printer's configuration kept in the printer's persistent store (the printer identity object can be used to get to the persistent store.).

```
                          TPrinterConfiguration class TPrinterConfiguration : public MCollectible {
    public:
        virtual~TPrinterConfiguration( );
        // for static state of the printer
        virtual TPageDescription&   GetDefaultPageDescription( ) const = 0;
        // subclasses can return static or current state of the printer from
            // following methods.
        virtual TPageList&          GetPageList( ) const = 0;
        virtual TMediaList&         GetMediaList( ) const = 0;
        virtual TResolutionList&    GetResolutionList( ) const = 0;
        virtual TRGBColor           GetEngineColor( ) const = 0;
        // for dynamic state of the printer
        virtual TPageDescription&   GetCurrentPageDescription( ) const = 0;
        virtual void                SetPageList(TpageList&) = 0;
        virtual void                SetMediaList(TMediaList&) = 0;
        virtual void                SetResolution(TResolution&) = 0;
        virtual TStream&  operator<<=(Tstream& fromwhere);
        virtual TStream&  operator>>=(TStream& towhere) const;
        virtual Boolean   IsEqual(const MCollectible*) const;
        virtual long      Hash( ) const;
```

| TPrinterConfiguration |
|---|
| protected:<br>    TPrinterConfiguration( );<br>    TPrinterConfiguration&operator=(const TPrinterConfiguration&);<br>}; |

TPrinterConfiguration is an abstract base class for a printer's state. It is part of the printer's persistent data kept current by the printer handler. Subclasses can store the actual configuration data in a file of their choice (e.g. dictionary, flat stream, etc.). For example, TPSPrinterConfiguration will use PPD files converted to a disk dictionary to keep configuration data. TPrinterConfiguration defines a protocol that provides for setting and getting configuration items such as page sizes, media, resolution(s), etc. When a printer is first available for use, its persistent store (a TModelStore) is created and TPrinterConfiguration is asked to write itself into the store. This becomes the printer's initial state which is updated when a print job is sent to it.

The lists returned by getters (TPageList, TMediaList, etc.) are implemented using C++ templates. As mentioned earlier, each type of printer has a subclass of TPrinterConfiguration that returns the printer's static configuration. This is streamed into the personality document which is given to the developer of that type of printer. The developer typically will edit the configuration instance (that is, the fields of the particular TPrinterConfiguration class) to include the printer's data.

| TPrintJobDescription |
|---|
| class TPrintJobDescription : public MCollectible<br>{<br>    public:<br>        MCollectibleDeclarationsMacro(TPrintJobDescription);<br>    public:<br>        TPrintJobDescription(TPrinterIdentity&);<br>        TPrintJobDescription(const<br>        TPrintJobDescription&);<br>    virtual ~TPrintJobDescription( );<br>    typedef enum EBannerPage { eNoBanner, eBriefBanner, eWholeBanner };<br>    //————————————<br>    // Description:  These member functions are pretty much self explanatory<br>    //                         except for notes as added.<br>    // Requires   :<br>    // Modifies   : The Job's state is altered to reflect the requested<br>    //                  operation.<br>    // Effects    :<br>    // Raises     :<br>    // Override   : All subclasses must override all virtual functions.<br>    //————————————<br>    virtual void          SetCopies(unsigned long);<br>    virtual unsigned long  GetCopies( ) const;<br>    virtual unsigned long  GetpageCount( ) const;<br>    virtual void          SetPageCount(unsigned long);<br>    virtual void          SetCoverPage(EBannerpage);<br>    virtual EBannerpage   GetCoverPage( ) const;<br>    virtual void          SetEndPage(EBannerpage);<br>    virtual EBannerPage   GetEndPage( ) const;<br>    //————————————<br>    // Punt choice specifies what the user wants to do when the page sizes<br>    // don't match between the document and the printer. These options<br>    // are defined in PageDescription.h<br>    //————————————<br>    virtual void          SetJobPuntChoice(EPuntOption choice);<br>    virtual EPuntOption   GetJobPuntChoice( ) const;<br>    // Get the printer that this PrintJobDescription comes from<br>    virtual void          GetPrinterIdentity(TPrinterIdentity&) const;<br>    // User interface. Equivalent to the classic Print Job dialog.<br>    virtual void          EditSelf( );<br>    // MCollectible support<br>    virtual TStream&        operator<<=(TStream& fromwhere);<br>    virtual TStream&        operator>>=(TStream& towhere) const;<br>    virtual TPrintJobDescription&  operator=(const TPrintJobDescription&);<br>    virtual Boolean        operator==(const TPrintJobDescription&) const;<br>    virtual Boolean        IsEqual(const MCollectible* right) const;<br>    protected:<br>        TPrintJobDescription( );  // for Streaming<br>}; |

TPrintJobDescription is a base class providing protocol for accessing/changing print time options like number of copies, cover page choices, punt options (what to do when there is a mismatch between the document and printer page sizes), etc. Developers can subclass this to add features specific to their device. The default implementation of TPrintJobDescription provides the choice of options common to all printers. The print job description gets streamed with a print job and is used by TPrintDevice (in the printer handler task) to send appropriate commands to the printer that implement the print time options. Each job description knows the printer that it is comes from. As a matter of fact, it is created by the printer model. The printer model gets it out of the printer's personality document. EditSelf is a place holder for a method that might be used to allow users to change job description attributes. This method might be called in response to the system wide print menu command.

While the invention is de scribed in terms of preferred embodiments in a specific system environment, those skilled in the art will recognize that the invention can be practiced, with modification, in other and different hardware and software environments within the spirit and scope of the appended claims.

Having thus described our invention, what I claim as new, and desire to secure by Letters Patent is:

1. Apparatus for use on a computer system having an imaging device, which is controlled by command primitives and pixelmaps and has a complexity limit, and a storage, the apparatus imaging a complex graphic image comprised of a plurality of graphic objects stored in the storage and comprising:

means responsive to each of the plurality of graphic objects for identifying imageable objects and non-imageable objects;

means for determining a complexity of each non-imageable object;

means for decomposing each non-imageable object with a complexity less than a predetermined threshold which depends on the imaging device complexity limit into a plurality of imageable objects;

means for converting each imageable object directly into command primitives;

means for transforming each non-imageable object with a complexity greater than the predetermined imaging device complexity threshold into a pixelmap; and means for forming command primitives and pixelmaps into an image data stream to control the imaging device.

2. The apparatus described in claim 1 wherein the decomposing means comprises means for converting the non-imageable object to a plurality of imageable line segments.

3. The apparatus described in claim 1 wherein the determining means comprises means for adjusting a complexity of a non-imageable object based upon an intersection of the non-imageable object with other imageable objects.

4. The apparatus described in claim 1 wherein the transforming means comprises:

means for generating a pixelmap of the non-imageable object; and means for rendering any intersections between the non-imageable object and an imageable object into said pixelmap.

5. The apparatus described in claim 4 wherein the generating means comprises:

means for generating a rectangular pixelmap enclosing the non-imageable object; and means for establishing a clipping region surrounding the non-imageable object within the rectangular pixelmap.

6. The apparatus described in claim 5 wherein the rendering means comprises:

means for rendering any intersections between the rectangular pixelmap and a imageable object into the rectangular pixelmap; and means for rendering a composite image of any intersections between the clipping region and a imageable object into the rectangular pixelmap.

7. The apparatus described in claim 1 wherein said imaging device is a printer.

8. The apparatus described in claim 1 wherein said imaging device is a display device.

9. A computer program product for use on a computer system having an imaging device, which is controlled by command primitives and pixelmaps and has a complexity limit, and a storage, the computer program product imaging a complex graphic image comprised of a plurality of graphic objects stored in the storage and comprising a computer usable medium having computer readable program code thereon including:

program code responsive to each of the plurality of graphic objects for identifying imageable objects and non-imageable objects;

program code for determining a complexity of each non-imageable object;

program code for decomposing each non-imageable object with a complexity less than a predetermined threshold which depends on the imaging device complexity limit into a plurality of imageable objects;

program code for converting each imageable object directly into command primitives;

program code for transforming each non-imageable object with a complexity greater than the predetermined imaging device complexity threshold into a pixelmap; and program code for forming command primitives and pixelmaps into an image data stream to control the imaging device.

10. The computer program product described in claim 9 wherein the decomposing program code comprises program code for converting the non-imageable object to a plurality of imageable line segments.

11. The computer program product described in claim 9 wherein the determining program code comprises program code for adjusting a complexity of a non-imageable object based upon an intersection of the non-imageable object with other imageable objects.

12. The computer program product described in claim 9 wherein the transforming program code comprises:

program code for generating a pixelmap of the non-imageable object; and program code for rendering any intersections between the non-imageable object and an imageable object into said pixelmap.

13. The computer program product described in claim 12 wherein the generating program code comprises:

program code for generating a rectangular pixelmap enclosing the non-imageable object; and program code for establishing a clipping region surrounding the non-imageable object within the rectangular pixelmap.

14. The computer program product described in claim 13 wherein the rendering program code comprises:

program code for rendering any intersections between the rectangular pixelmap and a imageable object into the rectangular pixelmap; and program code for rendering a composite image of any intersections between the clipping region and a imageable object into the rectangular pixelmap.

15. A method for use on a computer system having an imaging device which is controlled by command primitives and pixelmaps and has a complexity limit, and a storage, the method imaging a complex graphic image comprised of a plurality of graphic objects stored in the storage and comprising the steps of:

(a) identifying imageable objects and non-imageable objects in the plurality of graphic objects;

(b) determining a complexity of each non-imageable object;

(c) decomposing each non-imageable object with a complexity less than a predetermined threshold which depends on the imaging device complexity limit into a plurality of imageable objects;

(d) converting each imageable object directly into command primitives;

(e) transforming each non-imageable object with a complexity greater than the predetermined imaging device complexity threshold into a pixelmap; and (f) forming command primitives and pixelmaps into an image data stream to control the imaging device.

16. The method described in claim 15 wherein step (c) comprises the step of:

(c1) converting the non-imageable object to a plurality of imageable line segments.

17. The method described in claim 15 wherein step (b) comprises the step of:

(b1) adjusting a complexity of a non-imageable object based upon an intersection of the non-imageable object with other imageable objects.

18. The method described in claim 15 wherein step (e) comprises the steps of:

(e1) generating a pixelmap of the non-imageable object; and (e2) rendering any intersections between the non-imageable object and an imageable object into said pixelmap.

19. The method described in claim 18 wherein step (e1) comprises the steps of:

(e1a) generating a rectangular pixelmap enclosing the non-imageable object; and (e1b) establishing a clipping region surrounding the non-imageable object within the rectangular pixelmap.

20. The method described in claim 19 wherein step (e2) comprises the steps of:

(e2a) rendering any intersections between the rectangular pixelmap and a imageable object into the rectangular pixelmap; and (e2b) rendering a composite image of any intersections between the clipping region and a imageable object into the rectangular pixelmap.

21. The method described in claim 15 wherein said imaging device is a printer.

22. The method described in claim 15 wherein said imaging device is a display device.

* * * * *